US012739779B2

(12) United States Patent
Hirzallah et al.

(10) Patent No.: US 12,739,779 B2

(45) Date of Patent: Sep. 15, 2026

(54) MULTI-ANTENNA POSITIONING SIGNAL REPORTING

(71) Applicant: QUALCOMM Incorporated, San Diego, CA (US)

(72) Inventors: Mohammed Ali Mohammed Hirzallah, San Diego, CA (US); Ahmed Elshafie, San Diego, CA (US); Marwen Zorgui, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 455 days.

(21) Appl. No.: 18/454,721

(22) Filed: Aug. 23, 2023

(65) Prior Publication Data

US 2025/0071716 A1 Feb. 27, 2025

(51) Int. Cl.
*H04W 64/00* (2009.01)

(52) U.S. Cl.
CPC .................................. *H04W 64/00* (2013.01)

(58) Field of Classification Search
CPC .. F25B 2321/023; H10N 10/13; H10N 10/17; G01S 5/0221; G01S 5/0236; H04W 64/00
See application file for complete search history.

(56) References Cited

U.S. PATENT DOCUMENTS

2022/0011396 A1 1/2022 Keating et al.
2023/0017529 A1* 1/2023 Caporal Del Barrio ..................... H04L 25/0204
2023/0179953 A1 6/2023 Hirzallah et al.

FOREIGN PATENT DOCUMENTS

WO 2022076980 A1 4/2022

OTHER PUBLICATIONS

International Search Report and Written Opinion—PCT/US2024/043158—ISA/EPO—Nov. 28, 2024.

* cited by examiner

*Primary Examiner* — Timothy X Pham
(74) *Attorney, Agent, or Firm* — Procopio, Cory, Hargreaves & Savitch LLP

(57) ABSTRACT

A wireless device may receive a configuration message including a configuration to measure a first set of positioning signals associated with a first antenna and to measure a second set of positioning signals associated with a second antenna. The wireless device may receive the first set of positioning signals associated with the first antenna and the second set of positioning signals associated with the second antenna. The wireless device may measure the first set of positioning signals associated with the first antenna and the second set of positioning signals associated with the second antenna. The wireless device may transmit a set of report messages including a first indicator of a first subset of the measured first set of positioning signals associated with the first antenna and a second indicator of a second subset of the measured second set of positioning signals associated with the second antenna.

30 Claims, 16 Drawing Sheets

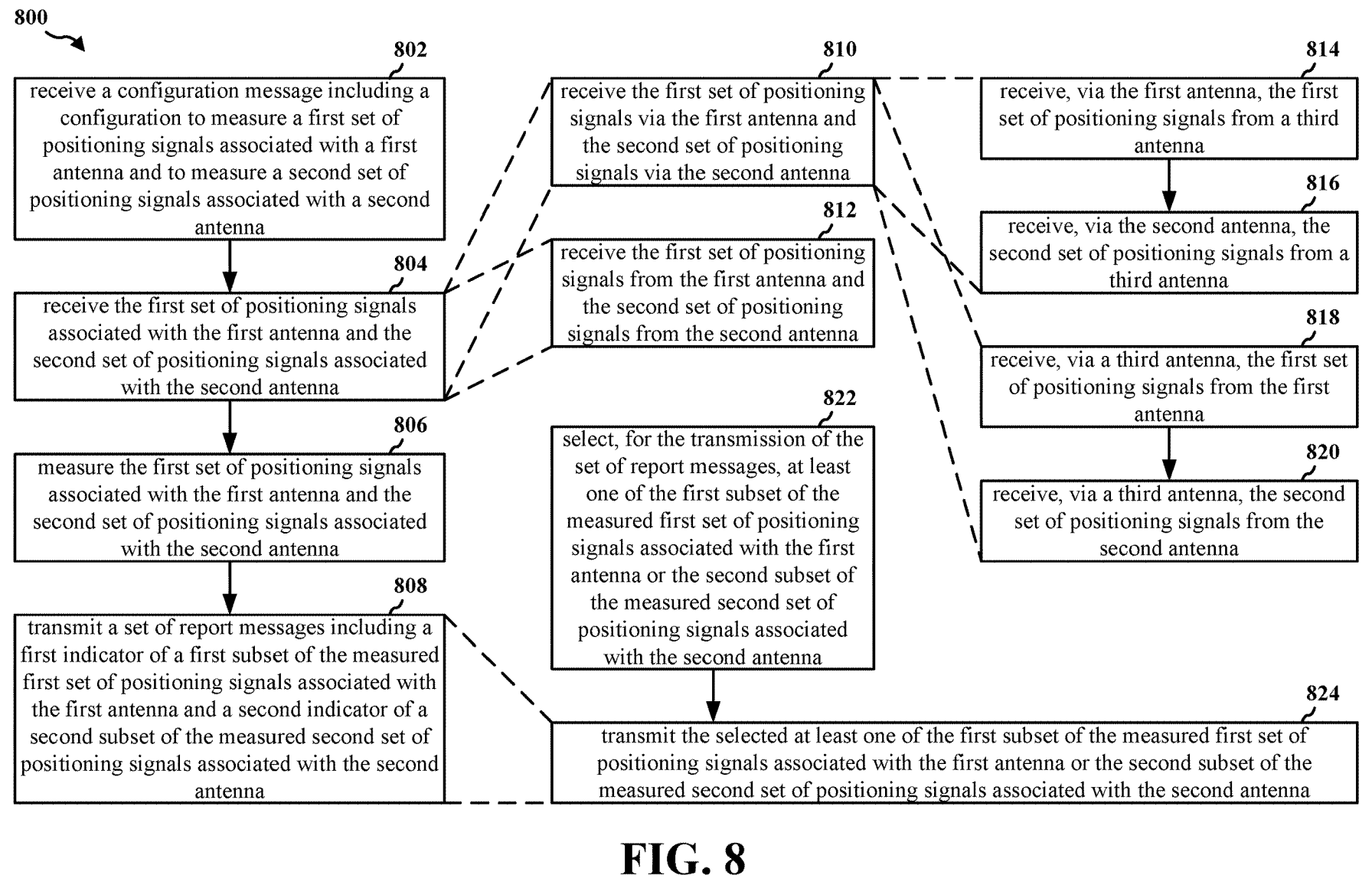

800

802 receive a configuration message including a configuration to measure a first set of positioning signals associated with a first antenna and to measure a second set of positioning signals associated with a second antenna 804 receive the first set of positioning signals associated with the first antenna and the second set of positioning signals associated with the second antenna 806 measure the first set of positioning signals associated with the first antenna and the second set of positioning signals associated with the second antenna 808 transmit a set of report messages including a first indicator of a first subset of the measured first set of positioning signals associated with the first antenna and a second indicator of a second subset of the measured second set of positioning signals associated with the second antenna 810 receive the first set of positioning signals via the first antenna and the second set of positioning signals via the second antenna 812 receive the first set of positioning signals from the first antenna and the second set of positioning signals from the second antenna 814 receive, via the first antenna, the first set of positioning signals from a third antenna 816 receive, via the second antenna, the second set of positioning signals from a third antenna 818 receive, via a third antenna, the first set of positioning signals from the first antenna 820 receive, via a third antenna, the second set of positioning signals from the second antenna 822 select, for the transmission of the set of report messages, at least one of the first subset of the measured first set of positioning signals associated with the first antenna or the second subset of the measured second set of positioning signals associated with the second antenna 824 transmit the selected at least one of the first subset of the measured first set of positioning signals associated with the first antenna or the second subset of the measured second set of positioning signals associated with the second antenna

FIG. 8

MULTI-ANTENNA POSITIONING SIGNAL REPORTING

TECHNICAL FIELD

The present disclosure relates generally to communication systems, and more particularly, to a wireless positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE), a base station, or a transmission reception point (TRP). The apparatus may receive a configuration message including a configuration to measure a first set of positioning signals associated with a first antenna and to measure a second set of positioning signals associated with a second antenna. The apparatus may receive the first set of positioning signals associated with the first antenna and the second set of positioning signals associated with the second antenna. The apparatus may measure the first set of positioning signals associated with the first antenna and the second set of positioning signals associated with the second antenna. The apparatus may transmit a set of report messages including a first indicator of a first subset of the measured first set of positioning signals associated with the first antenna and a second indicator of a second subset of the measured second set of positioning signals associated with the second antenna.

In an aspect of the disclosure, a method, a computer-readable medium, and an apparatus are provided. The apparatus may include a user equipment (UE), a base station, or a transmission reception point (TRP). The apparatus may receive a configuration message including a configuration to transmit a first set of positioning signals associated with a first antenna and to transmit a second set of positioning signals associated with a second antenna. The apparatus may transmit the first set of positioning signals associated with the first antenna and the second set of positioning signals associated with the second antenna.

In an aspect of the disclosure, a method, a computer-readable medium, and an apparatus are provided. The apparatus may include a network entity, such as a location management function (LMF). The apparatus may transmit a first configuration message including a first configuration to measure a first set of positioning signals associated with a first antenna and to measure a second set of positioning signals associated with a second antenna. The apparatus may transmit a second configuration message including a second configuration to transmit the first set of positioning signals associated with the first antenna and to transmit the second set of positioning signals associated with the second antenna. The apparatus may receive, based on the first configuration, a set of report messages including a first indicator of a first set of measurements of the first set of positioning signals associated with the first antenna and a second indicator of a second set of measurements of the second set of positioning signals associated with the second antenna.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a flowchart of a method of wireless communication.

DETAILED DESCRIPTION

Figure 1:
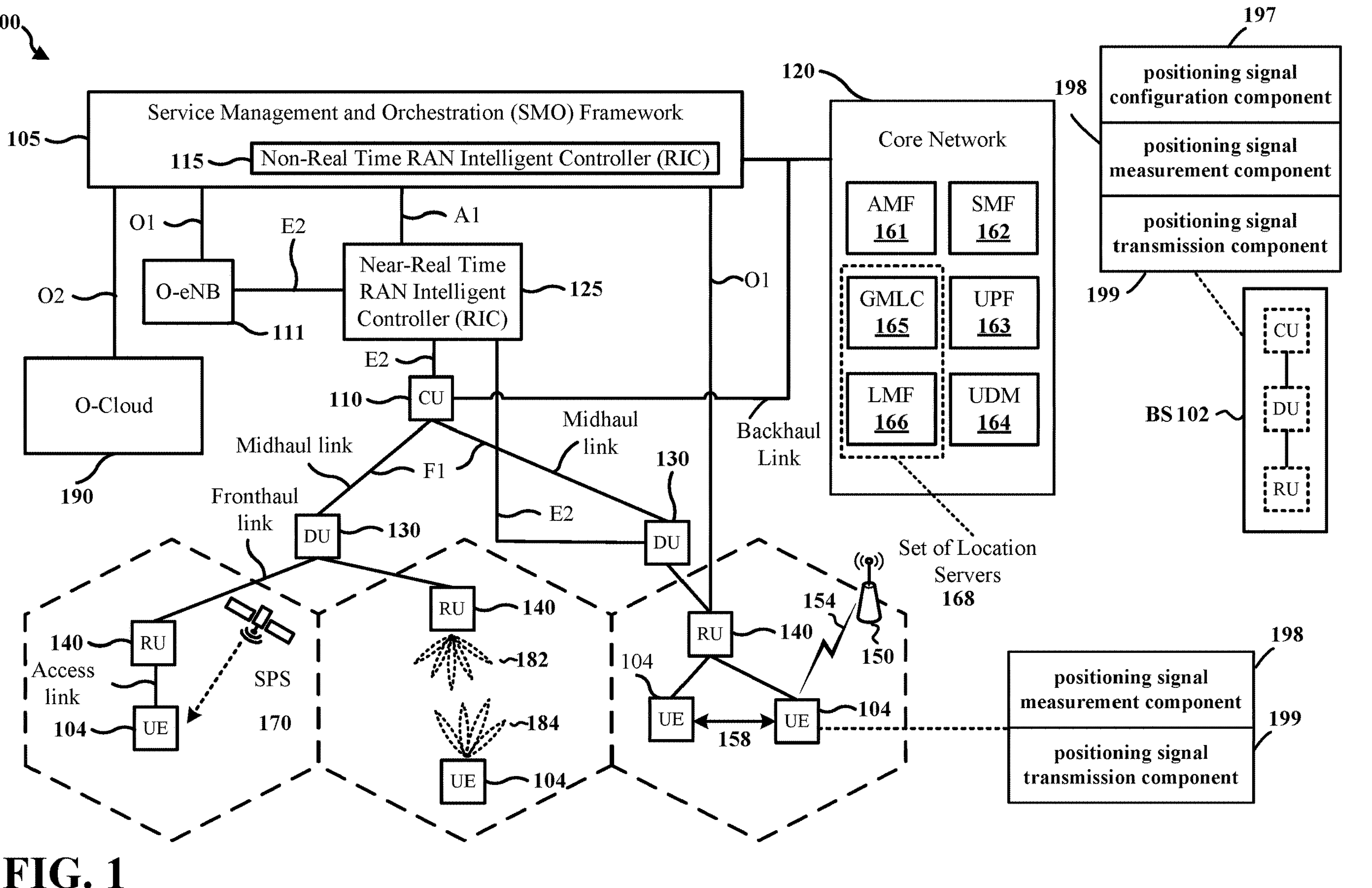
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 1102.11 standards, the IEEE 1102.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless positioning systems. Some aspects more specifically relate to measurement reports for wireless positioning systems. In some examples, a first wireless device, such as a user equipment (UE), a base station, or a transmission reception point (TRP), may receive a configuration message including a configuration to measure a first set of positioning signals associated with a first antenna and to measure a second set of positioning signals associated with a second antenna. The first wireless device may receive the first set of positioning signals associated with the first antenna and the second set of positioning signals associated with the second antenna. The first wireless device may measure the first set of positioning signals associated with the first antenna and the second set of positioning signals associated with the second antenna. The first wireless device may transmit a set of report messages including a first indicator of a first subset of the measured first set of positioning signals associated with the first antenna and a second indicator of a second subset of the measured second set of positioning signals associated with the second antenna. Receiving the first set of positioning signals associated with the first antenna and the second set of positioning signals associated with the second antenna may include receiving the first set of positioning signals associated with the first antenna and the second set of positioning signals associated with the second antenna from a second wireless device. A positioning signal may include a positioning reference signal (PRS), a channel state information (CSI) reference signal (CSI-RS), a tracking reference signal (TRS), or a synchronization signal block (SSB).

In some examples, a second wireless device, such as a UE, a base station, or a TRP, may receive a configuration message including a configuration to transmit a first set of positioning signals associated with a first antenna and to transmit a second set of positioning signals associated with a second antenna. The second wireless device may transmit the first set of positioning signals associated with the first antenna and the second set of positioning signals associated with the second antenna. Transmitting the first set of positioning signals and the second set of positioning signals may include transmitting the first and second sets of positioning signals to a first wireless device.

In some examples, a network entity, such as a location management function (LMF) may transmit a first configuration message including a first configuration to measure a first set of positioning signals associated with a first antenna and to measure a second set of positioning signals associated with a second antenna. The network entity may transmit a second configuration message including a second configuration to transmit the first set of positioning signals associated with the first antenna and to transmit the second set of positioning signals associated with the second antenna. The network entity may receive, based on the first configuration, a set of report messages including a first indicator of a first set of measurements of the first set of positioning signals associated with the first antenna and a second indicator of a second set of measurements of the second set of positioning signals associated with the second antenna.

In some aspects, measurement reports from a positioning wireless device, such as a UE, may not include positioning signal measurements at different antenna levels. Such information may be beneficial for training positioning models, such as those trained using artificial intelligence machine learning (AIML or AI/ML). A network entity, such as an LMF, may train such models using antenna-specific positioning signal measurements. In some aspects, a positioning wireless device may report multi-TX and/or multi-RX antenna positioning signal measurements to a network entity. In some aspects, a wireless device, such as a UE, may receive from ranking/prioritization rules from a network entity, such as an LMF. Such rules may indicate to the wireless device which TX/RX antennas to report. In some aspects, a report may include enhanced measurements (e.g., channel impulse response (CIR), channel frequency response (CFR), power delay profile (PDP), delay profile (DP)) on an antenna level. The measurement element may include a new field that has an RX/TX antenna panel identifier (ID). In some aspects, a wireless device may process positioning signal measurements associated with multiple antennas by selecting measurements to report that satisfy certain criteria (e.g., within a threshold range) or have the best radio characteristics. What constitutes a best radio characteristic may be defined in a report configuration. In some aspects, a network entity may receive, from a wireless device, a list of the capabilities of the wireless device to report multi-antenna positioning signal measurements. In response, the network entity may configure resources and requests the wireless device to report of multi-antenna positioning signal measurements. In some aspects, the wireless device may request assistance data (AD)/configurations to help the wireless device report multi-antenna positioning signal measurements. In response, the wireless device may receive, from a network entity, such AD/configurations. Such communications may be performed via a long-term evolution (LTE) positioning protocol (LPP) message (e.g., via an LPP annex (LPPa) assistance data exchange) or via a positioning broadcast message (e.g., a positioning system information block (posSIB)).

Particular aspects of the subject matter described in this disclosure can be implemented to realize one or more of the following potential advantages. In some examples, by reporting positioning signal measurements on an antenna level (e.g., by designating which antennas are transmitting and/or receiving the positioning signals), the described techniques can be used to enhance the performance of positioning. In some aspects, positioning models (e.g., AI/ML models) may trained using antenna-level measurements. The antenna-level positioning signal measurements may enhance the performance of positioning models by allowing the positioning model to learn antenna-level features and how the features map to the position of a wireless device.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 1102.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102 or the UE 104 may have a positioning signal measurement component 198 that may be configured to receive a configuration message including a configuration to measure a first set of positioning signals associated with a first antenna and to measure a second set of positioning signals associated with a second antenna. The positioning signal measurement component 198 may be configured to receive the first set of positioning signals associated with the first antenna and the second set of positioning signals associated with the second antenna. The positioning signal measurement component 198 may be configured to measure the first set of positioning signals associated with the first antenna and the second set of positioning signals associated with the second antenna. The positioning signal measurement component 198 may be configured to transmit a set of report messages including a first indicator of a first subset of the measured first set of positioning signals associated with the first antenna and a second indicator of a second subset of the measured second set of positioning signals associated with the second antenna. In certain aspects, the base station 102 or the UE may have a positioning signal transmission component 199 that may be configured to receive a configuration message including a configuration to transmit a first set of positioning signals associated with a first antenna and to transmit a second set of positioning signals associated with a second antenna. The positioning signal transmission component 199 may be configured to transmit the first set of positioning signals associated with the first antenna and the second set of positioning signals associated with the second antenna. In certain aspects, the base station 102, or a component of the core network 120 (e.g., the LMF 166), may have a positioning signal configuration component 197 that may be configured to transmit a first configuration message including a first configuration to measure a first set of positioning signals associated with a first antenna and to measure a second set of positioning signals associated with a second antenna. The positioning signal configuration component 197 may be configured to transmit a second configuration message including a second configuration to transmit the first set of positioning signals associated with the first antenna and to transmit the second set of positioning signals associated with the second antenna. The positioning signal configuration component 197 may be configured to receive, based on the first configuration, a set of report messages including a first indicator of a first set of measurements of the first set of positioning signals associated with the first antenna and a second indicator of a second set of measurements of the second set of positioning signals associated with the second antenna. In other words, the positioning signal configuration component 197 may configure transmission/measurement of positioning signals using multiple antennas. The positioning signal transmission component 199 may transmit the positioning signals using multiple antennas based on the configuration. The positioning signal transmission component 199 may measure the positioning signals using one or more antennas, and may report each measurement on an antenna level, for example by specifying which transmission antennas or reception antennas were used for each measurement.

Figures 2A, 2B, 2C, 2D:
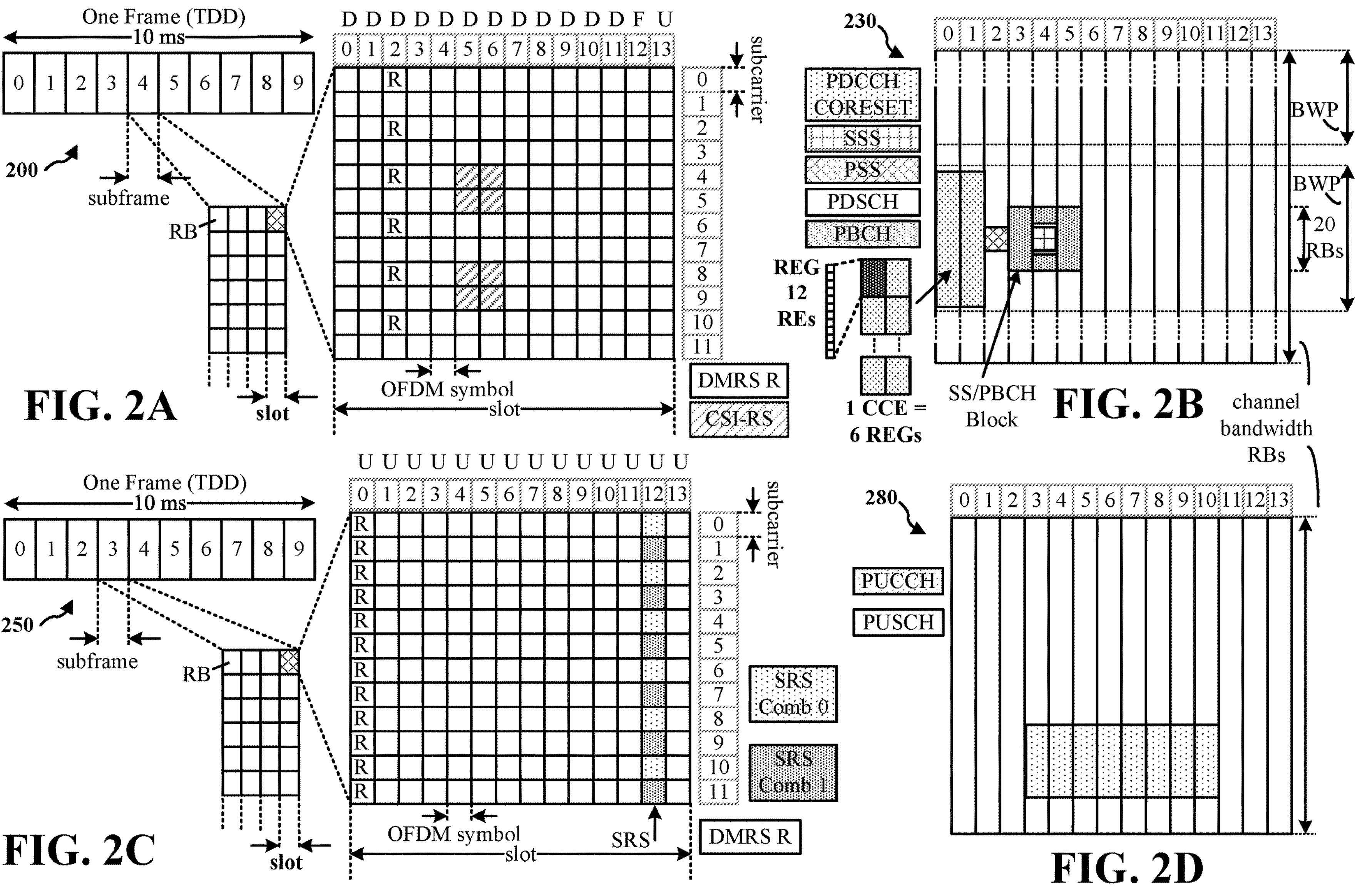
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
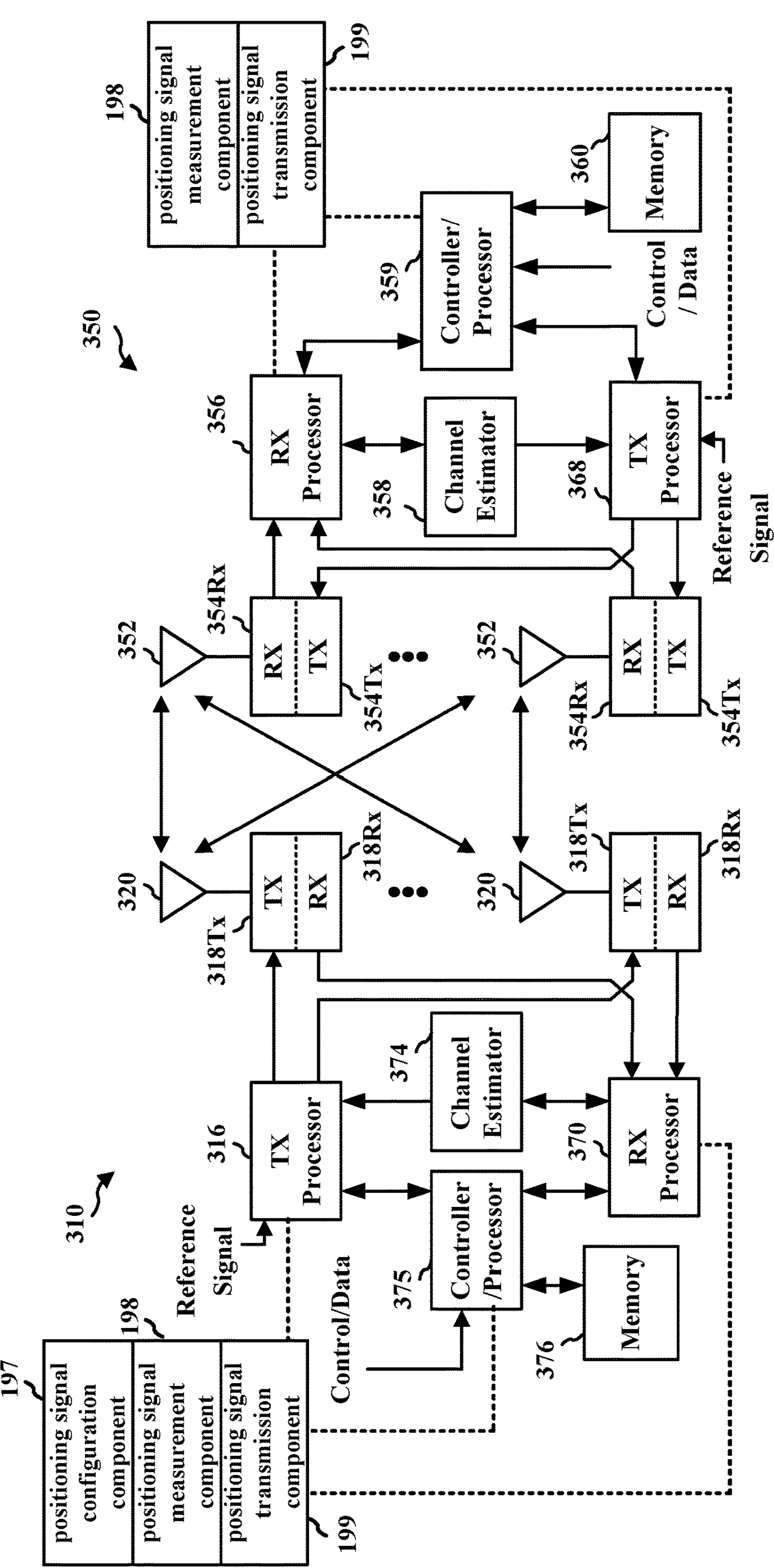
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning signal measurement component 198 of FIG. 1.

At least one of the TX processor 368, the RX processor 356, and the controller/processor 359 may be configured to perform aspects in connection with the positioning signal transmission component 199 of FIG. 1.

At least one of the TX processor 316, the RX processor 370, and the controller/processor 375 may be configured to perform aspects in connection with the positioning signal measurement component 198 of FIG. 1.

At least one of the TX processor 316, the RX processor 370, and the controller/processor 375 may be configured to perform aspects in connection with the positioning signal transmission component 199 of FIG. 1.

At least one of the TX processor 316, the RX processor 370, and the controller/processor 375 may be configured to perform aspects in connection with the positioning signal configuration component 197 of FIG. 1.

Figure 4:
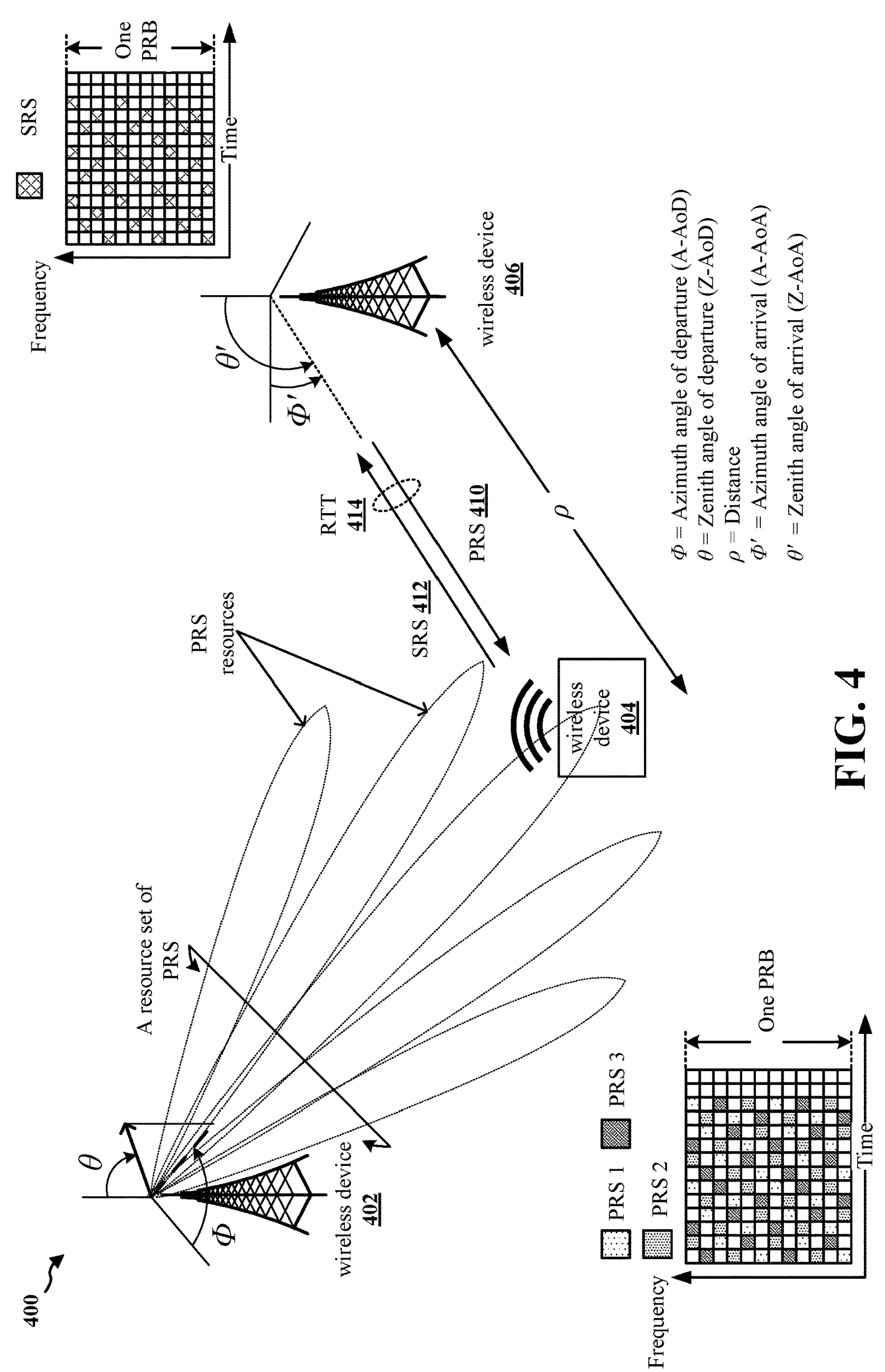
FIG. 4 is a diagram illustrating an example of a positioning session based on positioning signal measurements.

FIG. 4 is a diagram 400 illustrating an example of a positioning based on positioning signal measurements. A positioning signal may be any reference signal which may be measured to calculate a position attribute or a location attribute of a wireless device, for example a positioning reference signal (PRS), a sounding reference signal (SRS), a channel state information (CSI) reference signal (CSI-RS), a tracking reference signal (TRS), or a synchronization and signal block (SSB). The wireless device 402 may be a base station, such as a TRP, or a UE with a known position/location, such as a positioning reference unit (PRU) or a UE with a high-accuracy sensor that may identify the location of the UE, for example a GNSS sensor or a GPS sensor. The wireless device 406 may be a base station or a UE with a known position/location. The wireless device 404 may be a UE or a TRP configured to perform positioning to gather data, for example to gather data to train an artificial intelligence machine learning (AI/ML or AIML) model, test positioning signal strength or test positioning noise attributes in an area. The wireless device 404 may transmit UL-SRS 412 at time $T_{SRS\_TX}$ and receive DL positioning reference signals (PRS) (DL-PRS) 410 at time $T_{PRS\_RX}$. The wireless device 406 may receive the UL-SRS 412 at time $T_{SRS\_RX}$ and transmit the DL-PRS 410 at time $T_{PRS\_TX}$. The wireless device 404 may receive the DL-PRS 410 before transmitting the UL-SRS 412, or may transmit the UL-SRS 412 before receiving the DL-PRS 410. In both cases, a positioning server (e.g., location server(s) 168, LMF 166) or the wireless device 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple wireless devices 402, 406 and measured by the wireless device 404, and the measured TRP Rx-Tx time difference measurements (i.e., $|T_{SRS\_RX}-T_{PRS\_TX}|$) and UL-SRS-RSRP at multiple wireless devices 402, 406 of uplink signals transmitted from wireless device 404. The wireless device 404 may measure the UE Rx-Tx time difference measurements (and optionally DL-PRS-RSRP of the received signals) using assistance data received from a positioning server (e.g., an LMF), and the wireless devices 402, 406 may measure the gNB Rx-Tx time difference measurements (and optionally UL-SRS-RSRP of the received signals) using assistance data received from the positioning server. A positioning server may be any network device (e.g., an LMF, a set of location servers) that configure positioning occasions between wireless devices. Assistance data may be data provided by a positioning server to perform positioning, for example a configuration of resources for a set of positioning signals. The measurements may be used at the positioning server or the wireless device 404 to determine the RTT. The RTT may be used to estimate the location of the wireless device 404. Other methods are possible for determining the RTT, such as for example using DL-TDOA and/or UL-TDOA measurements.

DL-AoD positioning may make use of the measured DL-PRS-RSRP of downlink signals received from multiple wireless devices 402, 406 at the wireless device 404. The wireless device 404 may measure the DL-PRS-RSRP of the received signals using assistance data received from the positioning server, and the resulting measurements may be used along with the azimuth angle of departure (A-AoD), the zenith angle of departure (Z-AoD), and/or other configuration information to locate the wireless device 404 in relation to the neighboring wireless devices 402, 406.

DL-TDOA positioning may make use of the DL reference signal time difference (RSTD) (and optionally DL-PRS-RSRP) of downlink signals received from multiple wireless devices 402, 406 at the wireless device 404. The wireless device 404 may measure the DL RSTD (and optionally DL-PRS-RSRP) of the received signals using assistance data received from the positioning server, and the resulting measurements may be used along with other configuration information to locate a position/location of the wireless device 404 in relation to the neighboring wireless devices 402, 406.

UL-TDOA positioning may make use of the UL relative time of arrival (RTOA) (and optionally UL-SRS-RSRP) at multiple wireless devices 402, 406 of uplink signals transmitted from wireless device 404. The wireless devices 402, 406 may measure the UL-RTOA (and optionally UL-SRS-RSRP) of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices 402, 406 of uplink signals transmitted from the wireless device 404. The wireless devices 402, 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

A wireless device may measure a positioning signal in a variety of ways. For example, the wireless device 404 may measure a channel impulse response (CIR) of a positioning signal, a channel frequency response (CFR) of a positioning signal, a power delay profile (PDP) of a positioning signal, a signal-to-noise ratio (SNR) of a positioning signal, a signal-to-interference-plus-noise (SINR) of a positioning signal, a reference signal received power (RSRP) of a positioning signal, a reference signal received power path (RSRPP) of a positioning signal, a line-of-sight (LOS) probability of a positioning signal, a time-of-arrival (ToA) of a positioning signal, an angle of departure (AoD) of a positioning signal, an angle of arrival (AoA) of a positioning signal, a reference signal time difference (RSTD) between two received positioning signals, a delay spread of a positioning signal, and/or a Rician factor of a positioning signal. A LOS probability is the probability that there exists a direct line-of-sight path between a wireless device transmitting a positioning signal and a wireless device receiving the positioning signal. A Rician factor is a ratio between the measured power of the received direct path beam and the power of at least one other, received indirect path beam (e.g., a beam that reflects off of an object before being received by the wireless device receiving the positioning signal).

While the diagram 400 shows the wireless device 404 measuring a DL-PRS 410, the wireless device 404 may be configured to measure any positioning signal transmitted by another wireless device, for example an SRS, a PRS, a CSI-RS, a TRS, or an SSB. Where a positioning signal is a PRS, the PRS resources may include a positioning frequency layer, a PRS resource set, and/or a PRS resource. A PRS resource set may include a set of PRS resources. A positioning frequency layer may include a set of PRS resource sets. A PRS may include a set of positioning frequency layers. In some aspects, a network may configure a plurality of positioning frequency layers to account for operation on multiple sites, to target different center frequencies, and/or to target different center bands. Each PRS resource set may correspond with a set of base stations (e.g., TRPs) that belong to a set of cells. Each PRS resource may correspond with a sector, correspond with a beam, and/or correspond with a base station.

In some aspects, the wireless device 404 may train a positioning model using measurements of the positioning signal, for example an AI/ML positioning model. By training a positioning model, the wireless device 404 may calculate its position faster and/or with greater accuracy than by calculating its position using traditional techniques, such as geometry. In some aspects, the wireless device 404 may calculate its position with greater accuracy by measuring a positioning signal on a per-antenna basis, for example by measuring each positioning signal received via each antenna separately, and/or by measuring each positioning signal transmitted via each antenna separately. Such measurements may be referred to as multi-antenna positioning signal measurements, or as antenna-level positioning signal measurements. The performance of positioning models may be enhanced by utilizing multi-antenna positioning signal measurements. The performance of positioning models may also be enhanced by measuring positioning signals transmitted by multiple wireless devices (e.g., a plurality of TRPs) to calculate a position of a wireless device, such as the wireless device 404.

Figures 5A, 5B:
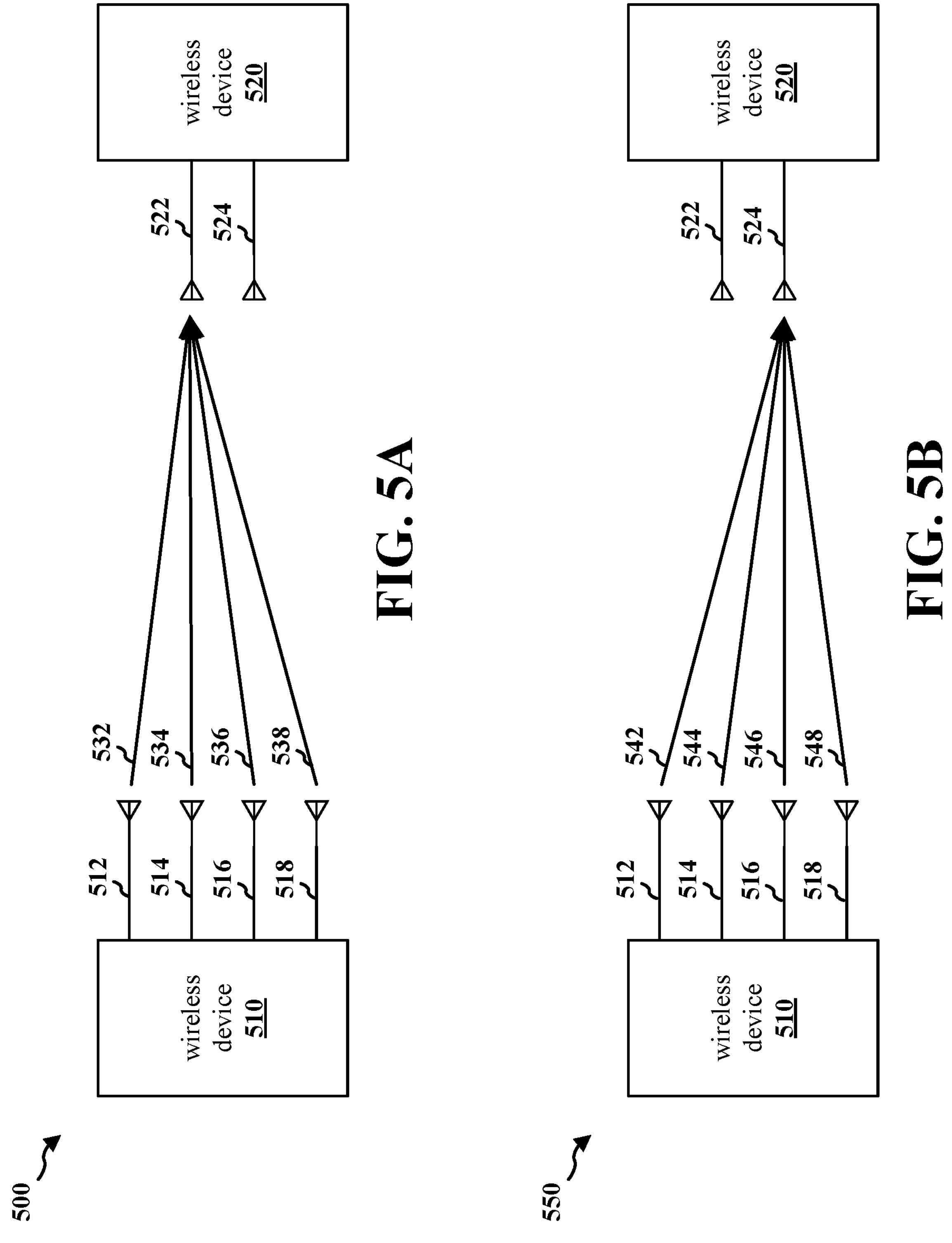
FIG. 5A is a diagram illustrating an example of a positioning session with a plurality of transmission and reception antennas.
FIG. 5B is a diagram illustrating an example of a positioning session with a plurality of transmission and reception antennas.

FIG. 5A has a diagram 500 and FIG. 5B has a diagram 550 illustrating an example of a positioning session with a plurality of transmission and reception antennas. The wireless device 510 may be a UE, a base station, or a TRP. The wireless device 520 may be a UE, a base station, or a TRP. The wireless device 510 may be a wireless device configured to transmit a set of positioning signals via one or more of a plurality of antennas, such as the antenna 512, the antenna 514, the antenna 516, and the antenna 518. The wireless device 520 may be a wireless device configured to receive a set of positioning signals via one or more of a plurality of antennas, such as the antenna 522 and the antenna 524. In other words, the wireless device 510 may transmit a set of positioning signals via one or more of a plurality of antennas, and the wireless device 520 may receive the set of positioning signals via one or more of a plurality of antennas. In some aspects, the wireless device 520 may measure the set of positioning signals by averaging, aggregating, or otherwise combining the measurements among the plurality of antennas. In other aspects, the wireless device 520 may measure the set of positioning signals by measuring each positioning signal transmitted and/or received by each antenna individually. In other aspects, the wireless device 520 may measure the set of positioning signals by grouping a set of positioning signals by a set of antenna identifiers, for example by grouping positioning signals received by antenna 522 in a first logical group, or by grouping positioning signals transmitted by antenna 514 in a second logical group, or by grouping positioning signals transmitted by the antenna 516 and the antenna 518 in a third logical group. The wireless device 520 may combine the measurements in a group in any suitable manner, for example by averaging, aggregating, weighting, or otherwise combining the measurements. By associating each measurement with a transmission antenna and/or a reception antenna, the accuracy of the positioning may be increased by accounting for more granular data. Each antenna may refer to a different panel, or antenna element, of a set of transceivers at the wireless device. Multi-antenna measurements of positioning signals (e.g., PRSs) may enhance the performance of positioning models trained using the measurements, for example artificial intelligence machine learning (AI/ML) positioning models. Even if an antenna is not able to capture a good reception, or is not able to transmit a good signal, the fact that the signal is not optimal may reveal information to a well-trained positioning model (e.g., a damaged antenna, an object that causes interference to some antennas and not others). In some aspects, the multi-antenna measurements may be transmitted to a network entity, such as an LMF, or a training entity for training a positioning model. In some aspects, the wireless device 520 may report a single measurement for each resource, for example one measurement per PRS resource, or may measure a set of measurements for an antenna, for example an average of measurements for positioning signals transmitted by an antenna, or an average of measurements for positioning signals received by an antenna. A resource may be categorized as a set of bandwidth parts (BWPs), a set of frequencies, a set of bands, a set of resources, a set of positioning frequency layer (PFLs), a set of sectors, a set of beams, a set of TRPs, or a set of cells.

For example, the antenna 512 may transmit a set of positioning signals 532 that are received by the antenna 522. The wireless device 520 may measure the set of positioning signals 532. The wireless device 520 may transmit a report that associates the measurement of the set of positioning signals 532 with an indicator of the antenna 512 and/or an indicator of the antenna 522. The indicator may indicate which antenna transmitted the set of positioning signals 532 and/or which antenna received the set of positioning signals 532. In another example, the antenna 514 may transmit a set of positioning signals 534 that are received by the antenna 522. The wireless device 520 may measure the set of positioning signals 534. The wireless device 520 may transmit a report that associates the measurement of the set of positioning signals 534 with an indicator of the antenna 514 and/or an indicator of the antenna 522. The indicator may indicate which antenna transmitted the set of positioning signals 534 and/or which antenna received the set of positioning signals 534. In another example, the antenna 516 may transmit a set of positioning signals 536 that are received by the antenna 522. The wireless device 520 may measure the set of positioning signals 536. The wireless device 520 may transmit a report that associates the measurement of the set of positioning signals 536 with an indicator of the antenna 516 and/or an indicator of the antenna 522. The indicator may indicate which antenna transmitted the set of positioning signals 536 and/or which antenna received the set of positioning signals 536. In another example, the antenna 518 may transmit a set of positioning signals 538 that are received by the antenna 522. The wireless device 520 may measure the set of positioning signals 538. The wireless device 520 may transmit a report that associates the measurement of the set of positioning signals 538 with an indicator of the antenna 518 and/or an indicator of the antenna 522. The indicator may indicate which antenna transmitted the set of positioning signals 538 and/or which antenna received the set of positioning signals 538. In another example, the antenna 512 may transmit a set of positioning signals 542 that are received by the antenna 524. The wireless device 520 may measure the set of positioning signals 542. The wireless device 520 may transmit a report that associates the measurement of the set of positioning signals 542 with an indicator of the antenna 512 and/or an indicator of the antenna 524. The indicator may indicate which antenna transmitted the set of positioning signals 542 and/or which antenna received the set of positioning signals 542. In another example, the antenna 514 may transmit a set of positioning signals 544 that are received by the antenna 524. The wireless device 520 may measure the set of positioning signals 544. The wireless device 520 may transmit a report that associates the measurement of the set of positioning signals 544 with an indicator of the antenna 514 and/or an indicator of the antenna 524. The indicator may indicate which antenna transmitted the set of positioning signals 544 and/or which antenna received the set of positioning signals 544. In another example, the antenna 516 may transmit a set of positioning signals 546 that are received by the antenna 524. The wireless device 520 may measure the set of positioning signals 546. The wireless device 520 may transmit a report that associates the measurement of the set of positioning signals 546 with an indicator of the antenna 516 and/or an indicator of the antenna 524. The indicator may indicate which antenna transmitted the set of positioning signals 546 and/or which antenna received the set of positioning signals 546. In another example, the antenna 518 may transmit a set of positioning signals 548 that are received by the antenna 524. The wireless device 520 may measure the set of positioning signals 548. The wireless device 520 may transmit a report that associates the measurement of the set of positioning signals 548 with an indicator of the antenna 518 and/or an indicator of the antenna 524. The indicator may indicate which antenna transmitted the set of positioning signals 548 and/or which antenna received the set of positioning signals 548.

While the diagrams 500 and 550 in FIGS. 5A and 5B, respectively, may indicate a wireless device 510 configured to transmit a set of positioning signals via four antennas and a wireless device 520 configured to receive a set of positioning signals via two antennas, any number of transmission antennas or any number of reception antennas may be used for a positioning session. For example, the wireless device 510 may be configured to transmit a set of positioning signals via one antenna or two antennas. In another example, the wireless device 520 may be configured to receive a set of positioning signals via one antenna or four antennas. In some aspects, a wireless device may be configured to transmit or receive positioning signals using less antennas than they have (e.g., wireless device 510 transmitting positioning signals from two out of its four antennas).

In some aspects, the wireless device 520 that measures the positioning signals may report measurements with an indicator of each transmission antenna that corresponds with a measurement. In some aspects, the wireless device 520 that measures the positioning signals may report measurements with an indicator of each reception antenna that corresponds with a measurement. An indicator of a transmission antenna or a reception antenna may include an identifier (ID) of an antenna element, such as an antenna ID or a panel ID. A report may include an explicit indicator, for example an indicator of an antenna that transmits a PRS or an indicator of an antenna that receives a PRS. The report may be, for example, a DL-TDoA report, a DL-AoD report, a multi-RTT report, an UL-TDoA report, or an UL-AoD report. The wireless device 520 may be configured to report measurements of positioning signals per transmission antenna. The wireless device 520 may be configured to collect one or more different types of measurements, for example (a) an RSTD measurement, (b) an LOS measurement, (c) an RSRP measurement, (d) an RSRPP measurement, (e) an AoD measurement, (f) a CIR measurement, (g) a CFR measurement, (h) a PDP measurement, (i) a delay profile measurement, and/or (j) a Rician factor measurement.

The wireless device 520 may be configured to report measurements of positioning signals per reception antenna. The wireless device 520 may be configured to prioritize which antennas to report (e.g., measurements with an RSRP greater or equal to a threshold value). In some aspects, the wireless device 520 that measures the positioning signals may rank/prioritize certain measurements and may report the highest ranked measurements. For example, the wireless device 520 may be configured to report measurements for antennas that satisfy certain characteristics, such as a threshold range. A threshold range may be bounded (e.g., $a \leq x \leq b$, $a<x<b$) or unbounded (e.g., $a \leq x$, $a<y$). In some aspects, the wireless device 520 may be configured to report measurements for antennas where the SNR satisfies a threshold range (e.g., an $SNR \geq \gamma_{snr}$). In some aspects, the wireless device 520 may be configured to report measurements for antennas where the SINR satisfies a threshold range (e.g., an $SINR \geq \gamma_{sinr}$). In some aspects, the wireless device 520 may be configured to report measurements for antennas where the RSRP satisfies a threshold range (e.g., an $RSRP \geq \gamma_{rsrp}$). In some aspects, the wireless device 520 may be configured to report measurements for antennas where the delay spread satisfies a threshold range (e.g., a delay spread$\leq \gamma_{ds}$). In some aspects, the wireless device 520 may be configured to report measurements for antennas where the Rician Factor satisfies a threshold range (e.g., a Rician Factor$\geq \gamma_K$). In some aspects, the wireless device 520 may be configured to report measurements for antennas where the LOS probability satisfies a threshold range (e.g., a LOS probability$\geq \gamma_{LOS}$). In some aspects, the wireless device 520 may be configured to report measurements for antennas where the ToA satisfies a threshold range (e.g., a $ToA \leq \gamma_{ToA}$). In some aspects, the wireless device 520 may be configured to report measurements for antennas where the RSTD between a positioning signal and a reference positioning signal satisfies a threshold range (e.g., an $RSTD \leq \gamma_{RSTD}$). In some aspects, the wireless device 520 may be configured with such threshold ranges based on a condition (e.g., the values of $\gamma_{snr}$, $\gamma_{rsrp}$, $\gamma_{ds}$, $\gamma_K$, $\gamma_{LOS}$, $\gamma_{ToA}$, and/or $\gamma_{RSTD}$ may be specified in a standard for a network). In some aspects, the wireless device 520 may be configured with such threshold ranges by a network entity (e.g., the values of $\gamma_{snr}$, $\gamma_{rsrp}$, $\gamma_{ds}$, $\gamma_K$, $\gamma_{LOS}$, $\gamma_{ToA}$, and/or $\gamma_{RSTD}$ may be configured by an LMF). In some aspects, the wireless device 520 may be configured with such threshold ranges by an admin user, for example a user that follows a standard.

In some aspects, the wireless device 520 that measures the positioning signals may report measurements from a number of antennas (e.g., a configured number L) that have the best radio characteristics. A set of measurements with the best radio characteristics may be defined as ones that have the highest values (e.g., the highest measured RSRP values) or the lowest values (e.g., the lowest measured delay spread). In some aspects, the wireless device 520 may be configured to report measurements for a number of antennas that have the best SNR (e.g., the L antenna measurements that have the highest measured SNR). In some aspects, the wireless device 520 may be configured to report measurements for a number of antennas that have the best RSRP (e.g., the L antenna measurements that have the highest measured RSRP). In some aspects, the wireless device 520 may be configured to report measurements for a number of antennas that have the best LOS probability (e.g., the L antenna measurements that have the highest measured LOS probabilities). In some aspects, the wireless device 520 may be configured to report measurements for a number of antennas that have the best ToA (e.g., the L antenna measurements that have the lowest measured ToA). In some aspects, the wireless device 520 may be configured to report measurements for a number of antennas that have the best RSTD (e.g., the L antenna measurements that have the lowest measured RSTD from a reference positioning signal). In some aspects, the wireless device 520 may be configured to report measurements for a number of antennas that have the best delay spread (e.g., the L antenna measurements that have the lowest measured delay spread). In some aspects, the wireless device 520 may be configured to report measurements for a number of antennas that have the best Rician factor (e.g., the L antenna measurements that have the highest measured Rician factors). In some aspects, the number of antennas may be configured based on a condition (e.g., the value of L may be specified in a standard for a network). In some aspects, the number of antennas may be configured by a network entity (e.g., the value of L may be configured by an LMF).

In some aspects, the wireless device 520 may indicate to a network entity, such as an LMF, its capability to report multi-antenna positioning signal measurements. In other words, the wireless device 520 may transmit a capability message to a network entity that includes at least one indicator of its capability to report multi-antenna positioning signal measurements. The capability message may include a maximum number of reported transmission antennas. The capability message may include a maximum number of reported reception antennas. The capability message may include a maximum number of reported transmission/reception antennas. The capability message may include any supported ranking/prioritization when reporting the multi-antenna positioning signal measurements. The capability message may include the types of measurements that the wireless device 520 can support on an antenna level. The types of measurements may include, for example, a CIR measurement, a CFR measurement, a PDP measurement, an SNR measurement, an RSRP measurement, an RSRPP measurement, an LOS probability measurement, a ToA measurement, an AoD measurement, an AoA measurement, an RSTD measurement, a delay spread measurement, a delay profile measurement, and/or a Rician factor measurement. In some aspects, a network entity may transmit a request to the wireless device 520 to indicate its capability, and, in response to the request, the wireless device 520 may transmit a capability message to the network entity. In some aspects, the capability request/response may be transmitted via an LPP message, for example via an LPPa capability exchange procedure. The network entity may receive a list of the capabilities of the wireless device 520 to report multi-antenna positioning signal measurements, and may configure resources and request the wireless device 520 to report multi-antenna positioning signal measurements based on the capability. For example, the network entity may restrict a positioning session or a report by the maximum number of antennas that the wireless device 520 may report, or may request a type of ranking (e.g., an RSRP≥$\gamma_{rsrp}$) based on the type of supported ranking/prioritization that the wireless device 520 supports.

In some aspects, the network entity may transmit assistance data (AD) to the wireless device 520 to help the wireless device 520 to report the multi-antenna positioning measurements. For example, the AD may configure the transmission antennas, the reception antennas, and/or the transmission and reception antenna combinations to be reported by the wireless device 520. In another example, the AD may configure any ranking/prioritization to be included in a report. In another example, the AD may configure a prioritization parameter (e.g., a threshold range). In another example, the AD may configure a measurement/processing gap (e.g., a gap between positioning signal occasions, a gap between a reception of a positioning signal and a transmission of a measurement report) for the wireless device 520 to do the reporting. In another example, the AD may configure a reporting periodicity. In another example, the AD may configure a reporting quantity (e.g., a number of measurements to be buffered and transmitted in a report, or a set of reports). In another example, the AD may configure a reporting occasion (e.g., an event that triggers the wireless device 520 to transmit a set of reports). Such an occasion may be when the measured SNR is within a threshold range. In another example, the AD may configure a type of measurement (e.g., CIR, CFR, PDP, SNR, RSRP, RSRPP, LOS probability, ToA, AoD, AoA, RSTD, delay spread, delay profile, Rician factor, PDP). In some aspects, the wireless device 520 may transmit a request to the network entity to transmit AD to configure the reporting of the multi-antenna positioning signal measurements. The network entity may transmit the AD in response to receiving the request. In some aspects, the request/AD may be transmitted via an LPP message, for example via an LPPa capability exchange procedure. In some aspects, the request/AD may be transmitted via a posSIB message.

In some aspects, the network entity may transmit a set of configurations that describe how the wireless device 520 will measure/process/report multi-antenna positioning signal measurements. The set of configurations may be transmitted as part of the AD (e.g., an LPPa assistance data exchange procedure) and/or a posSIB. The set of configurations may indicate any ranking/prioritization of multi-antenna positioning signal measurements to be reported. The set of configurations may indicate any ranking/prioritization parameters. The set of configurations may indicate any processing/measurement gaps for the wireless device 520 to process measurements and/or to report the measurements. The set of configurations may indicate a reporting periodicity. The set of configurations may indicate a reporting quantity. The set of configurations may indicate a reporting occasion. The set of configurations may indicate a type of measurement. In some aspects, the wireless device 520 may transmit a request to the network entity to transmit the set of configurations to configure the reporting of the multi-antenna positioning signal measurements. The network entity may transmit the set of configurations in response to receiving the request.

The AD may be transmitted separately from a positioning session, or may be transmitted as part of a positioning session procedure. The set of configurations may be transmitted separately from a positioning session, or may be transmitted as part of a positioning session procedure. In some aspects, a positioning session may include a capability exchange, a request for positioning information, a request for measurement, a request for AD, a transmission/reception of positioning signals, a measurement of positioning signals, and/or a reporting of multi-antenna positioning signal measurements.

Figure 6:
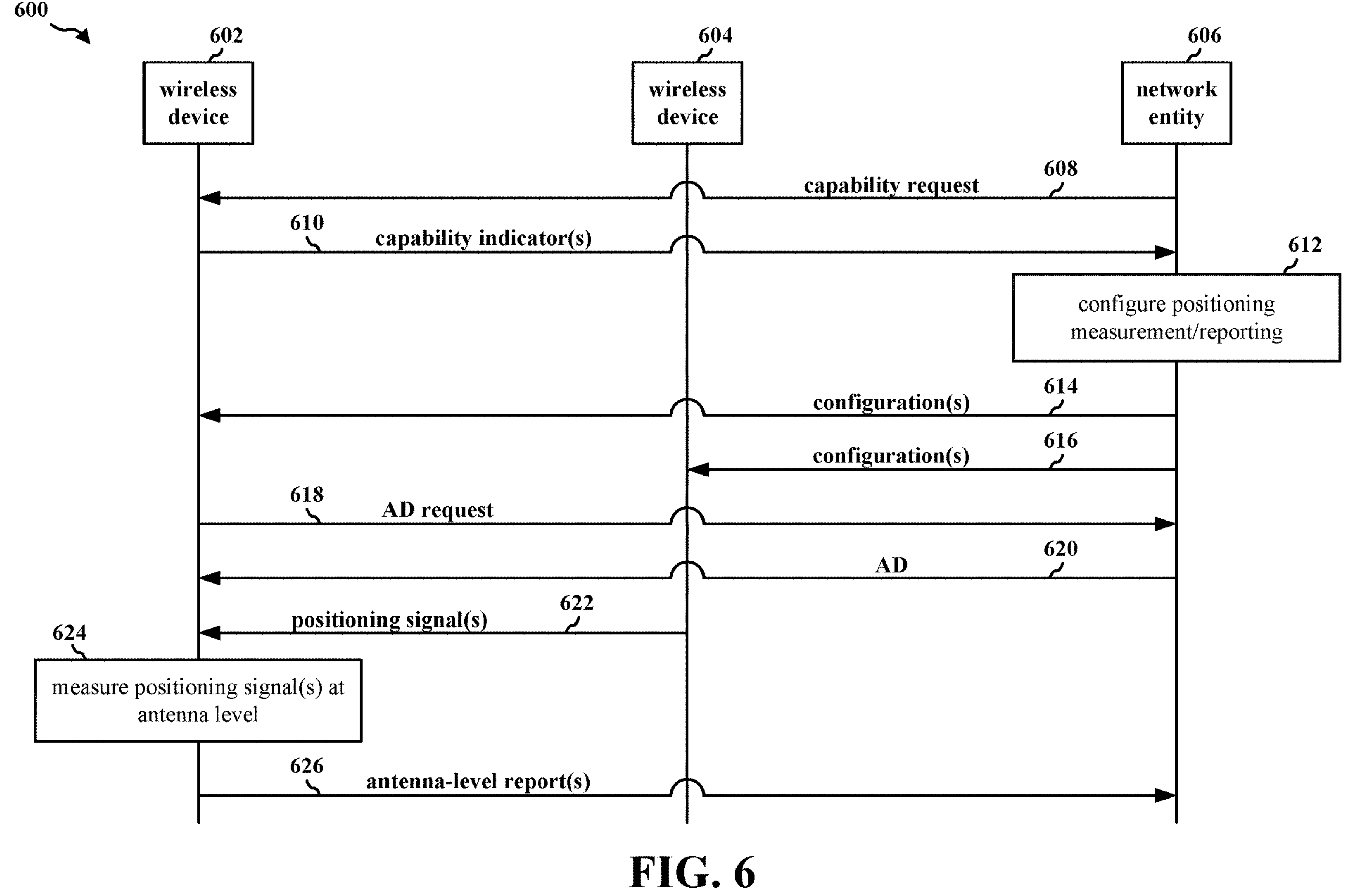
FIG. 6 is a connection flow diagram illustrating an example of an antenna-level positioning session.

FIG. 6 is a connection flow diagram 600 illustrating an example of an antenna-level positioning session. The wireless device 602 may be a wireless device that receives a set of positioning signals 622, measures the set of positioning signals 622 at 624 at an antenna level, and transmits a set of reports 626 of the antenna-level measurements. The wireless device 602 may be, for example, a UE, a base station, or a TRP. The wireless device 604 may be a wireless device that transmits the set of positioning signals 622 to be measured. The wireless device 604 may be, for example, a UE, a base station, or a TRP. The network entity 606 may be a network device, for example an LMF, that configures antenna-level measurements for a positioning session.

The network entity 606 may transmit a capability request 608 to the wireless device 602. The wireless device 602 may receive the capability request 608 from the network entity 606. The network entity 606 may transmit an LPP message including the capability request 608 with an indicator for the wireless device 602 to report its capability to report antenna-level positioning signal measurements. For example, the network entity 606 may transmit an LPP capability exchange message that includes the capability request 608. In response to receiving the capability request 608, the wireless device 602 may transmit a set of capability indicators 610 to the network entity 606. The network entity 606 may receive the set of capability indicators 610 from the wireless device 602. The set of capability indicators 610 may be included in an LPP message from the wireless device 602 to the network entity 606. The set of capability indicators 610 may include a list of capabilities of the wireless device 602 to report antenna-level positioning signal measurements. The set of capability indicators 610 may include a maximum number of reported transmission antennas. The set of capability indicators 610 may include a maximum number of reported reception antennas. The set of capability indicators 610 may include a maximum number of reported transmission/reception antennas. The set of capability indicators 610 may include an indicator of any supported ranking/prioritization when reporting the multi-antenna positioning signal measurements. The set of capability indicators 610 may include the types of measurements that the wireless device 602 is able to support on an antenna level. The types of measurements may include, for example, a CIR measurement, a CFR measurement, a PDP measurement, an SNR measurement, an RSRP measurement, an RSRPP measurement, an LOS probability measurement, a ToA measurement, an AoD measurement, an AoA measurement, an RSTD measurement, a delay spread measurement, a delay profile, a Rician factor measurement, and/or a PDP measurement.

At 612, the network entity 606 may configure a positioning session. The network entity 606 may configure the positioning session based on the set of capability indicators 610. For example, the network entity 606 may restrict a positioning session or a report by the maximum number of antennas that the wireless device 602 may report, or may request a type of ranking based on the type of supported ranking/prioritization that the wireless device 602 supports.

In some aspects, the network entity 606 may transmit a set of configurations 614 to the wireless device 602. The wireless device 602 may receive the set of configurations 614 from the network entity 606. The set of configurations 614 may include a schedule of when the set of positioning signals 622 will be transmitted by the wireless device 604, and/or will be received by the wireless device 602. The set of configurations 614 include an indicator of positioning signal resources associated with the set of positioning signals 622. The set of configurations 614 may include an indicator of how many antennas the wireless device 602 should use to receive the set of positioning signals 622. The set of configurations 614 may include an indicator of which antennas the wireless device 602 should use to receive the set of positioning signals 622. The set of configuration set of configurations 614 may include an indicator of a schedule of which positioning signals will be transmitted by identified antennas of the wireless device 604. The set of configurations 614 may include an indicator of a schedule of which positioning signals should be received and measured by identified antennas of the wireless device 602. The set of configurations 614 may include an indicator that describes how the wireless device 602 will measure/process/report multi-antenna positioning signal measurements of the set of positioning signals 622. The set of configurations 614 may be transmitted as an LPP message (e.g., as part of an LPPa assistance data exchange procedure) and/or a positioning system information block (posSIB) message. The network entity 606 may broadcast the set of configurations 614 as a posSIB message. The set of configurations 614 may include an indicator of any ranking/prioritization of multi-antenna positioning signal measurements for the wireless device 602 to include in the set of reports 626. The set of configurations 614 may include an indicator of any ranking/prioritization parameters for the wireless device 602 to include in the set of reports 626. The set of configurations 614 may include an indicator of any processing/measurement gaps for the wireless device 602 to process the measurements at 624 and/or to report the measurements in the set of reports 626. The set of configurations 614 may indicate a reporting periodicity for the wireless device 602 to transmit the set of reports 626. The set of configurations 614 may include an indicator of a reporting quantity, such as a number of measurements to include in a report of the set of reports 626 or in the set of reports 626. The set of configurations 614 may include an indicator of a reporting occasion that triggers the wireless device 602 to transmit the set of reports 626. The set of configurations 614 may include an indicator of a type of measurement for the wireless device 602 to measure. In some aspects, the wireless device 602 may transmit a request to the network entity 606 to transmit the set of configurations 614 to configure the reporting of the multi-antenna positioning signal measurements. The network entity 606 may transmit the set of configurations 614 in response to receiving such a request. In some aspects, the set of reports 626 may include a single report including indicators of measurements associated with each of the transmission/reception antennas indicated in the set of configurations 614/assistance data (AD) 620. In some aspects, the set of reports may include a plurality of reports, where each report may correspond with a set of transmission/reception antennas indicated in the set of configurations 614/AD 620. In some aspects, the network entity 606 may transmit a provide location message to the wireless device 602 that include the set of configurations 614. The provide location message may include an indicator to the wireless device 602 that the network entity 606 has AD available to share.

In some aspects, the network entity 606 may transmit a set of configurations 616 to the wireless device 604. The set of configurations 616 may include a schedule of when the set of positioning signals 622 will be transmitted by the wireless device 604. The set of configurations 616 may indicate positioning signal resources associated with the set of positioning signals 622. The set of configurations 616 may indicate how many antennas the wireless device 604 should use to transmit the set of positioning signals 622. The set of configurations 616 may indicate which antennas the wireless device 604 should use to transmit the set of positioning signals 622. The set of configurations 616 may indicate a schedule of when the wireless device 604 should transmit each of the set of positioning signals 622 via a set of identified antennas.

In some aspects, the wireless device 602 may transmit a request 618 to the network entity 606 to transmit AD to configure the reporting of the multi-antenna positioning signal measurements by the wireless device 602. The network entity 606 may receive the request 618 from the wireless device 602. The wireless device 602 may transmit the request in response to receiving the set of configurations 614. In some aspects, the request 618 may be transmitted via an LPP message, for example via an LPPa capability exchange procedure. In some aspects, the request 618 may be transmitted via a posSIB message. In some aspects, the wireless device 602 may transmit the request 618 in response to receiving the set of configurations 614, for example in response to receiving a provide location message from the network entity 606.

In some aspects, the network entity 606 may transmit AD 620 to the wireless device 602. The network entity 606 may transmit the AD 620 in response to receiving the request 618. The AD 620 may indicate how many antennas the wireless device 602 should use to receive the set of positioning signals 622. The AD 620 may indicate which antennas the wireless device 602 should use to receive the set of positioning signals 622. The AD 620 may describe how the wireless device 602 will measure/process/report multi-antenna positioning signal measurements of the set of positioning signals 622. The AD 620 may indicate any ranking/prioritization of multi-antenna positioning signal measurements for the wireless device 602 to include in the set of reports 626. The AD 620 may indicate any ranking/prioritization parameters for the wireless device 602 to include in the set of reports 626. The AD 620 may indicate any processing/measurement gaps for the wireless device 602 to process the measurements at 624 and/or to report the measurements in the set of reports 626. The AD 620 may indicate a reporting periodicity for the wireless device 602 to transmit the set of reports 626. The AD 620 may indicate a reporting quantity, such as a number of measurements to include in a report of the set of reports 626 or in the set of reports 626. The AD 620 may indicate a reporting occasion that triggers the wireless device 602 to transmit the set of reports 626. The AD 620 may indicate a type of measurement for the wireless device 602 to measure. In some aspects, the AD 620 may include at least some configuration for measuring and/or reporting the set of positioning signals 622 in an antenna-specific manner. In some aspects, the network entity 606 may configure reporting by the wireless device 602 via the set of configurations 614. In some aspects, the network entity 606 may configure reporting by the wireless device 602 via the AD 620. In some aspects, the network entity 606 may configure reporting by the wireless device 602 via both the set of configurations 614 and the AD 620 (e.g., some configuration attributes in the set of configurations 614, some configuration attributes in the AD 620).

The wireless device 604 may transmit the set of positioning signals 622 to the wireless device 602. The wireless device 602 may receive the set of positioning signals 622 from the wireless device 604. At 624, the wireless device 602 may measure the set of positioning signals 622 based on the set of configurations 614 and/or based on the AD 620. The wireless device 602 may measure the set of positioning signals 622 at the antenna level, for example by categorizing the measurements by a transmission antenna, by a reception antenna, and/or by a transmission/reception antenna combination.

The wireless device 602 may transmit the set of reports 626 to the network entity 606. The network entity 606 may receive the set of reports 626 from the wireless device 602. The set of reports 626 may include antenna-level measurements measured by the wireless device 602 at 624. The set of reports 626 may include a subset of the measurements, for example the reports may exclude measurements that do not satisfy a threshold range or may exclude measurements from antennas that do not have the best radio characteristics as compared with measurements from other antennas. In some aspects, the wireless device 602 may transmit the set of reports 626 to another entity, for example a core network, one or more location servers, or an over-the-top (OTT) server configured to train a positioning model.

Figure 7:
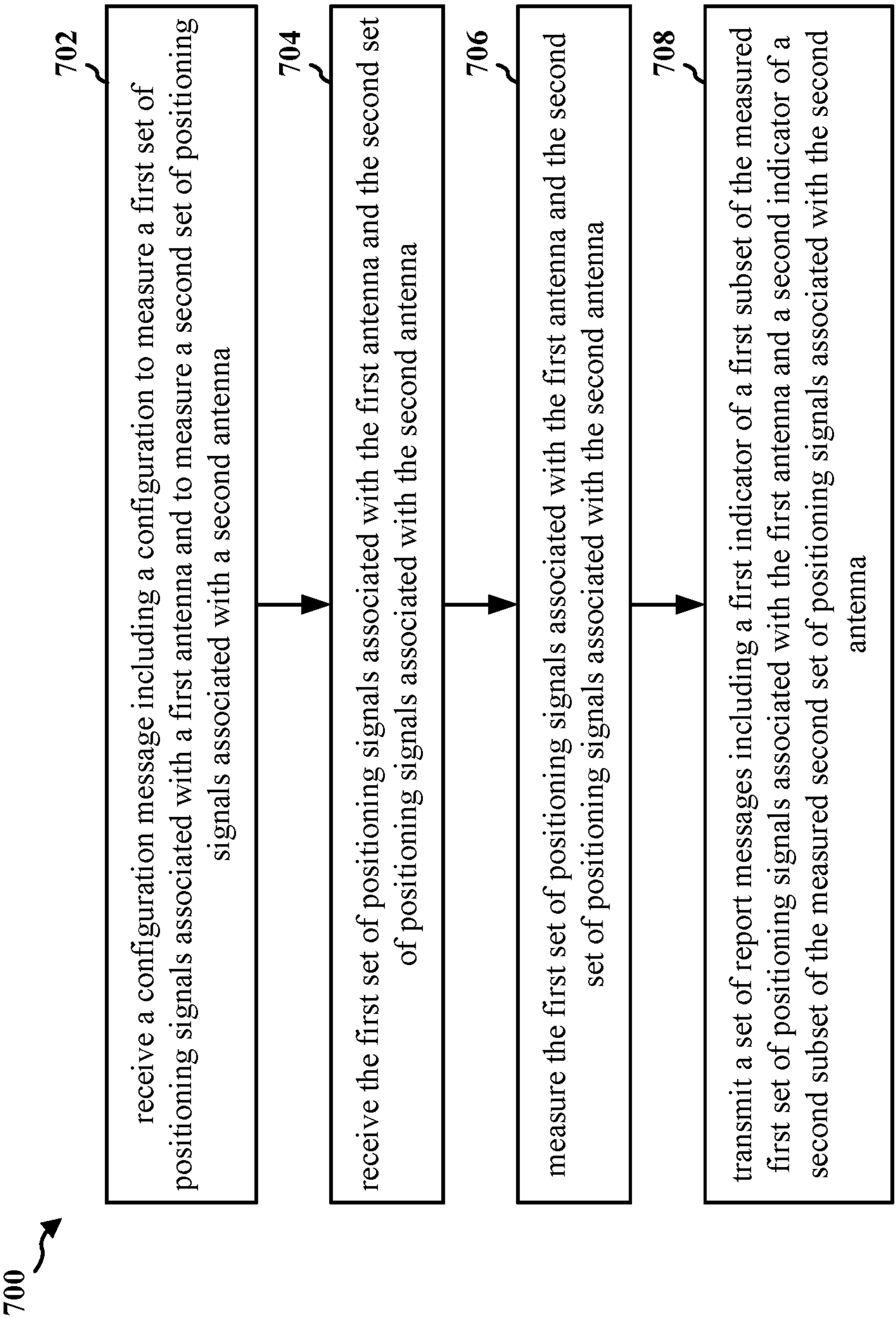
FIG. 7 is a flowchart of a method of wireless communication.

FIG. 7 is a flowchart 700 of a method of wireless communication. The method may be performed by a first wireless device (e.g., the UE 104, the UE 350; the base station 102, the base station 310; the wireless device 510, the wireless device 602; the apparatus 1404; the network entity 1402, the network entity 1502). At 702, the first wireless device may receive a configuration message including a configuration to measure a first set of positioning signals associated with a first antenna and to measure a second set of positioning signals associated with a second antenna. For example, 702 may be performed by the wireless device 602 in FIG. 6, which may receive the set of configurations 614. The set of configurations 614 may include a configuration for the wireless device 602 to measure a first set of positioning signals associated with a first antenna and to measure a second set of positioning signals associated with a second antenna. The set of positioning signals 622 may include the first set of positioning signals and the second set of positioning signals. Moreover, 702 may be performed by the component 198 in FIG. 1, 3, 14, or 15.

At 704, the first wireless device may receive the first set of positioning signals associated with the first antenna and the second set of positioning signals associated with the second antenna. For example, 704 may be performed by the wireless device 602 in FIG. 6, which may receive the set of positioning signals 622. The set of positioning signals 622 may include the first set of positioning signals associated with the first antenna and the second set of positioning signals associated with the second antenna. The first set of positioning signals and the second set of positioning signals may include at least one of a PRS, a CSI-RS, a TRS, an SSB, or an SRS. Moreover, 704 may be performed by the component 198 in FIG. 1, 3, 14, or 15.

At 706, the first wireless device may measure the first set of positioning signals associated with the first antenna and the second set of positioning signals associated with the second antenna. For example, 706 may be performed by the wireless device 602 in FIG. 6, which may, at 624, measure the set of positioning signals 622. The set of positioning signals 622 may include the first set of positioning signals associated with the first antenna and the second set of positioning signals associated with the second antenna. Moreover, 706 may be performed by the component 198 in FIG. 1, 3, 14, or 15.

At 708, the first wireless device may transmit a set of report messages including a first indicator of a first subset of the measured first set of positioning signals associated with the first antenna and a second indicator of a second subset of the measured second set of positioning signals associated with the second antenna. For example, 708 may be performed by the wireless device 602 in FIG. 6, which may transmit the set of reports 626 to the network entity 606. The set of reports 626 may include a first indicator of a first subset of the measured first set of positioning signals associated with the first antenna and a second indicator of a second subset of the measured second set of positioning signals associated with the second antenna. Moreover, 708 may be performed by the component 198 in FIG. 1, 3, 14, or 15.

FIG. 8 is a flowchart 800 of a method of wireless communication. The method may be performed by a first wireless device (e.g., the UE 104, the UE 350; the base station 102, the base station 310; the wireless device 510, the wireless device 602; the apparatus 1404; the network entity 1402, the network entity 1502). At 802, the first wireless device may receive a configuration message including a configuration to measure a first set of positioning signals associated with a first antenna and to measure a second set of positioning signals associated with a second antenna. For example, 802 may be performed by the wireless device 602 in FIG. 6, which may receive the set of configurations 614. The set of configurations 614 may include a configuration for the wireless device 602 to measure a first set of positioning signals associated with a first antenna and to measure a second set of positioning signals associated with a second antenna. The set of positioning signals 622 may include the first set of positioning signals and the second set of positioning signals. Moreover, 802 may be performed by the component 198 in FIG. 1, 3, 14, or 15.

At 804, the first wireless device may receive the first set of positioning signals associated with the first antenna and the second set of positioning signals associated with the second antenna. For example, 804 may be performed by the wireless device 602 in FIG. 6, which may receive the set of positioning signals 622. The set of positioning signals 622 may include the first set of positioning signals associated with the first antenna and the second set of positioning signals associated with the second antenna. The first set of positioning signals and the second set of positioning signals may include at least one of a PRS, a CSI-RS, a TRS, an SSB, or an SRS. Moreover, 804 may be performed by the component 198 in FIG. 1, 3, 14, or 15.

At 806, the first wireless device may measure the first set of positioning signals associated with the first antenna and the second set of positioning signals associated with the second antenna. For example, 806 may be performed by the wireless device 602 in FIG. 6, which may, at 624, measure the set of positioning signals 622. The set of positioning signals 622 may include the first set of positioning signals associated with the first antenna and the second set of positioning signals associated with the second antenna. Moreover, 806 may be performed by the component 198 in FIG. 1, 3, 14, or 15.

At 808, the first wireless device may transmit a set of report messages including a first indicator of a first subset of the measured first set of positioning signals associated with the first antenna and a second indicator of a second subset of the measured second set of positioning signals associated with the second antenna. For example, 808 may be performed by the wireless device 602 in FIG. 6, which may transmit the set of reports 626 to the network entity 606. The set of reports 626 may include a first indicator of a first subset of the measured first set of positioning signals associated with the first antenna and a second indicator of a second subset of the measured second set of positioning signals associated with the second antenna. Moreover, 808 may be performed by the component 198 in FIG. 1, 3, 14, or 15.

At 810, the first wireless device may receive the first set of positioning signals associated with the first antenna and the second set of positioning signals associated with the second antenna by receiving the first set of positioning signals via the first antenna and the second set of positioning signals via the second antenna. For example, 810 may be performed by the wireless device 602 in FIG. 6, which may receive the first set of positioning signals via the first antenna at the wireless device 602 and the second set of positioning signals via the second antenna at the wireless device 602. In other words, the wireless device 602 may include the first antenna and the second antenna. Moreover, 810 may be performed by the component 198 in FIG. 1, 3, 14, or 15.

At 812, the first wireless device may receive the first set of positioning signals associated with the first antenna and the second set of positioning signals associated with the second antenna by receiving the first set of positioning signals from the first antenna and the second set of positioning signals from the second antenna. For example, 812 may be performed by the wireless device 602 in FIG. 6, which may receive the first set of positioning signals from the first antenna at the wireless device 604 and the second set of positioning signals from the second antenna at the wireless device 604. In other words, the wireless device 604 may include the first antenna and the second antenna. Moreover, 812 may be performed by the component 198 in FIG. 1, 3, 14, or 15.

At 814, the first wireless device may receive the first set of positioning signals via the first antenna by receiving, via the first antenna, the first set of positioning signals from a third antenna. The second wireless device may include the third antenna. For example, 814 may be performed by the wireless device 602 in FIG. 6, which may receive, via the first antenna of the wireless device 602, the first set of positioning signals from a third antenna. The wireless device 604 may include the third antenna. Moreover, 814 may be performed by the component 198 in FIG. 1, 3, 14, or 15.

At 816, the first wireless device may receive the second set of positioning signals via the second antenna by receiving, via the second antenna, the second set of positioning signals from the third antenna. The second wireless device may include the third antenna. For example, 816 may be performed by the wireless device 602 in FIG. 6, which may receive, via the second antenna at the wireless device 602, the second set of positioning signals from a third antenna. The wireless device 604 may include the third antenna. Moreover, 816 may be performed by the component 198 in FIG. 1, 3, 14, or 15.

At 818, the first wireless device may receive, via a third antenna, the first set of positioning signals from the first antenna. The first wireless device may include the third antenna. For example, 818 may be performed by the wireless device 602 in FIG. 6, which may receive, via a third antenna at the wireless device 602, the first set of positioning signals from the first antenna at the wireless device 604. The wireless device 602 may include the third antenna. Moreover, 818 may be performed by the component 198 in FIG. 1, 3, 14, or 15.

At 820, the first wireless device may receive, via a third antenna, the second set of positioning signals from the second antenna. The first wireless device may include the third antenna. For example, 820 may be performed by the wireless device 602 in FIG. 6, which may receive, via a third antenna at the wireless device 602, the second set of positioning signals from the second antenna at the wireless device 604. The wireless device 602 may include the third antenna. Moreover, 820 may be performed by the component 198 in FIG. 1, 3, 14, or 15.

At 822, the first wireless device may select, for the transmission of the set of report messages, at least one of the first subset of the measured first set of positioning signals associated with the first antenna or the second subset of the measured second set of positioning signals associated with the second antenna. The first wireless device may select at least one of the first subset of the measured first set of positioning signals associated with the first antenna or the second subset of the measured second set of positioning signals associated with the second antenna based on at least one of (1) an SNR satisfying a first threshold range, (2) an RSRP satisfying a second threshold range, (3) a LOS probability satisfying a third threshold range, (4) a ToA satisfying a fourth threshold range, (5) an RSTD satisfying a fifth threshold range, (6) a delay spread satisfying a sixth threshold range, or (7) a Rician factor satisfying a seventh threshold range. In some aspects, the first wireless device may receive a second configuration including at least one of (1) a third indicator of the first threshold range, (2) a fourth indicator of the second threshold range, (3) a fifth indicator of the third threshold range, (4) a sixth indicator of the fourth threshold range, (5) a seventh indicator of the fifth threshold range, (6) an eighth indicator of the sixth threshold range, or (7) a ninth indicator of the seventh threshold range. For example, 822 may be performed by the wireless device 602 in FIG. 6, which may select, for the transmission of the set of report messages, at least one of the first subset of the measured first set of positioning signals associated with the first antenna or the second subset of the measured second set of positioning signals associated with the second antenna. The wireless device 602 may select at least one of the first subset of the measured first set of positioning signals associated with the first antenna or the second subset of the measured second set of positioning signals associated with the second antenna based on at least one of (1) an SNR satisfying a first threshold range, (2) an RSRP satisfying a second threshold range, (3) a LOS probability satisfying a third threshold range, (4) a ToA satisfying a fourth threshold range, (5) an RSTD satisfying a fifth threshold range, (6) a delay spread satisfying a sixth threshold range, or (7) a Rician factor satisfying a seventh threshold range. In some aspects, the wireless device 602 may receive, in the set of configurations 614, a second configuration including at least one of (1) a third indicator of the first threshold range, (2) a fourth indicator of the second threshold range, (3) a fifth indicator of the third threshold range, (4) a sixth indicator of the fourth threshold range, (5) a seventh indicator of the fifth threshold range, (6) an eighth indicator of the sixth threshold range, or (7) a ninth indicator of the seventh threshold range. The first and second configurations may be received as a single transmission or as separate transmissions. Moreover, 822 may be performed by the component 198 in FIG. 1, 3, 14, or 15.

At 824, the first wireless device may transmit the set of report messages by transmitting the selected at least one of the first subset of the measured first set of positioning signals associated with the first antenna or the second subset of the measured second set of positioning signals associated with the second antenna. For example, 824 may be performed by the wireless device 602 in FIG. 6, which may transmit the selected at least one of the first subset of the measured first set of positioning signals associated with the first antenna or the second subset of the measured second set of positioning signals associated with the second antenna from 822. Moreover, 824 may be performed by the component 198 in FIG. 1, 3, 14, or 15.

Figure 9:
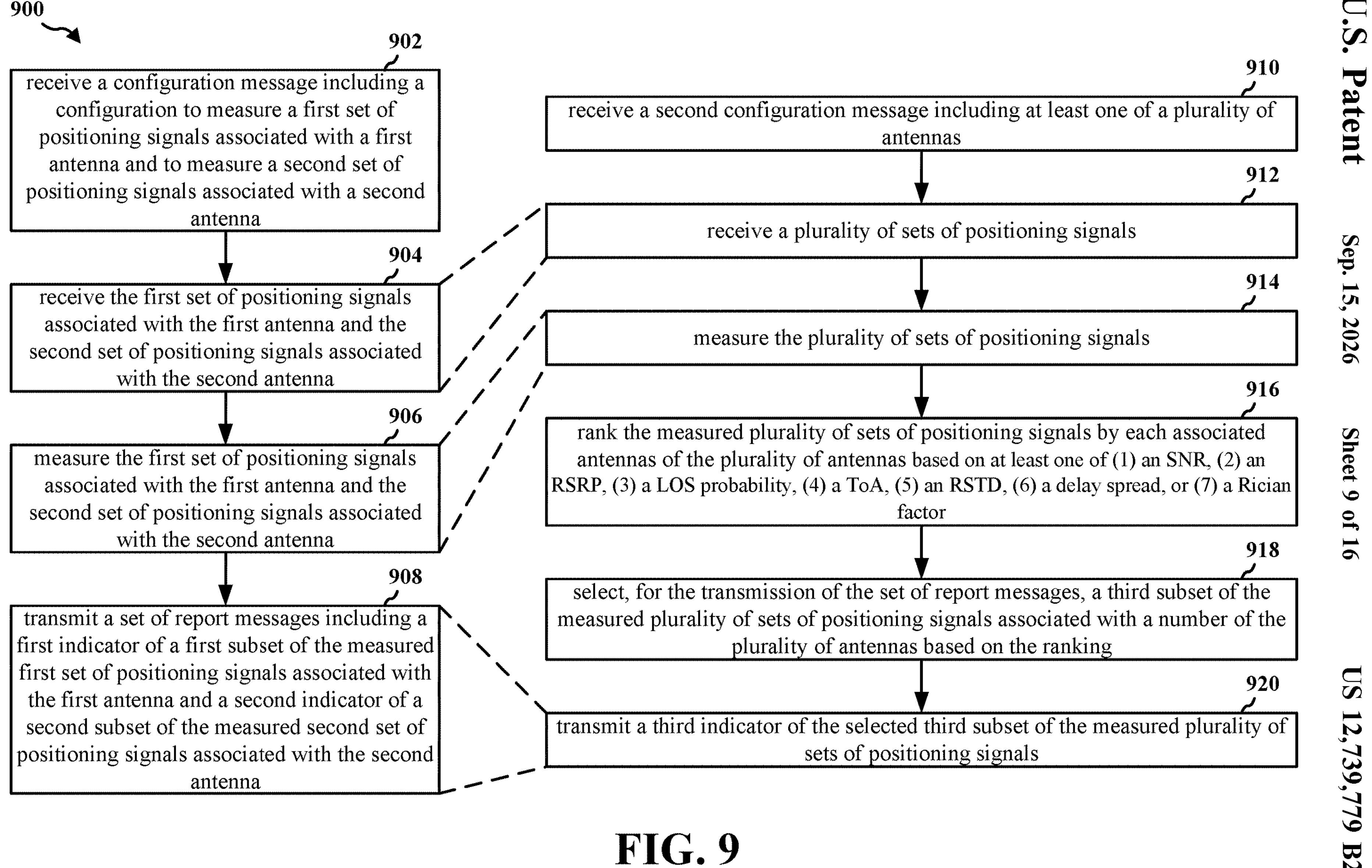
FIG. 9 is a flowchart of a method of wireless communication.

FIG. 9 is a flowchart 900 of a method of wireless communication. The method may be performed by a first wireless device (e.g., the UE 104, the UE 350; the base station 102, the base station 310; the wireless device 510, the wireless device 602; the apparatus 1404; the network entity 1402, the network entity 1502). At 902, the first wireless device may receive a configuration message including a configuration to measure a first set of positioning signals associated with a first antenna and to measure a second set of positioning signals associated with a second antenna. For example, 902 may be performed by the wireless device 602 in FIG. 6, which may receive the set of configurations 614. The set of configurations 614 may include a configuration for the wireless device 602 to measure a first set of positioning signals associated with a first antenna and to measure a second set of positioning signals associated with a second antenna. The set of positioning signals 622 may include the first set of positioning signals and the second set of positioning signals. Moreover, 902 may be performed by the component 198 in FIG. 1, 3, 14, or 15.

At 904, the first wireless device may receive the first set of positioning signals associated with the first antenna and the second set of positioning signals associated with the second antenna. For example, 904 may be performed by the wireless device 602 in FIG. 6, which may receive the set of positioning signals 622. The set of positioning signals 622 may include the first set of positioning signals associated with the first antenna and the second set of positioning signals associated with the second antenna. The first set of positioning signals and the second set of positioning signals may include at least one of a PRS, a CSI-RS, a TRS, an SSB, or an SRS. Moreover, 904 may be performed by the component 198 in FIG. 1, 3, 14, or 15.

At 906, the first wireless device may measure the first set of positioning signals associated with the first antenna and the second set of positioning signals associated with the second antenna. For example, 906 may be performed by the wireless device 602 in FIG. 6, which may, at 624, measure the set of positioning signals 622. The set of positioning signals 622 may include the first set of positioning signals associated with the first antenna and the second set of positioning signals associated with the second antenna. Moreover, 906 may be performed by the component 198 in FIG. 1, 3, 14, or 15.

At 908, the first wireless device may transmit a set of report messages including a first indicator of a first subset of the measured first set of positioning signals associated with the first antenna and a second indicator of a second subset of the measured second set of positioning signals associated with the second antenna. For example, 908 may be performed by the wireless device 602 in FIG. 6, which may transmit the set of reports 626 to the network entity 606. The set of reports 626 may include a first indicator of a first subset of the measured first set of positioning signals associated with the first antenna and a second indicator of a second subset of the measured second set of positioning signals associated with the second antenna. Moreover, 908 may be performed by the component 198 in FIG. 1, 3, 14, or 15.

At 910, the first wireless device may receive a second configuration message including at least one of a plurality of antennas. For example, 910 may be performed by the wireless device 602 in FIG. 6, which may receive the set of configurations 614 including at least one of a plurality of antennas. The plurality of antennas may include a plurality of antennas at the wireless device 602. The plurality of antennas may include a plurality of antennas at the wireless device 604. The plurality of antennas may include a set of antennas at the wireless device 602 and a set of antennas at the wireless device 604. Moreover, 910 may be performed by the component 198 in FIG. 1, 3, 14, or 15.

At 912, the first wireless device may receive a plurality of sets of positioning signals. The plurality of sets of positioning signals may include the first set of positioning signals and the second set of positioning signals. A plurality of antennas may include the first antenna and the second antenna. The plurality of antennas may be the plurality of antennas from 910. Each set of the plurality of sets of positioning signals may be associated with an antenna of the plurality of antennas (e.g., transmitting from or received via). For example, 912 may be performed by the wireless device 602 in FIG. 6, which may receive the set of positioning signals 622. The set of positioning signals 622 may be a plurality of sets of positioning signals. The plurality of sets of positioning signals may include the first set of positioning signals and the second set of positioning signals. A plurality of antennas may include the first antenna and the second antenna. The plurality of antennas may be the plurality of antennas from 910. Each set of the plurality of sets of positioning signals may be associated with an antenna of the plurality of antennas (e.g., transmitting from an antenna of one or more antennas at wireless device 604 or received via an antenna of one or more antennas at wireless device 602). Moreover, 912 may be performed by the component 198 in FIG. 1, 3, 14, or 15.

At 914, the first wireless device may measure the plurality of sets of positioning signals. For example, 914 may be performed by the wireless device 602 in FIG. 6, which may, at 624, measure the plurality of sets of positioning signals. Moreover, 914 may be performed by the component 198 in FIG. 1, 3, 14, or 15.

At 916, the first wireless device may rank the measured plurality of sets of positioning signals by each associated antenna of the plurality of antennas based on at least one of (1) an SNR, (2) an RSRP, (3) a LOS probability, (4) a ToA, (5) an RSTD, (6) a delay spread, or (7) a Rician factor. For example, 916 may be performed by the wireless device 602 in FIG. 6, which may rank the measured plurality of sets of positioning signals, measured at 624, by each associated antenna of the plurality of antennas based on at least one of (1) an SNR, (2) an RSRP, (3) a LOS probability, (4) a ToA, (5) an RSTD, (6) a delay spread, or (7) a Rician factor. The ranking may be from highest value to lowest value, or vice-versa. The ranking may be of a highest measured value of a set of values for that antennas, may be of a lowest measured value of a set of values for that antenna, or may be a statistical representation (e.g., mean, median, weighted average) of a set of values for that antenna. Moreover, 916 may be performed by the component 198 in FIG. 1, 3, 14, or 15.

At 918, the first wireless device may select, for the transmission of the set of report messages, a third subset of the measured plurality of sets of positioning signals associated with a number of the plurality of antennas based on the ranking. For example, 918 may be performed by the wireless device 602 in FIG. 6, which may select, for the transmission of the set of reports 626, a third subset of the measured plurality of sets of positioning signals associated with a number of the plurality of antennas based on the ranking (e.g., top 8 RSRP antennas, best 3 LOS probability antennas). Moreover, 918 may be performed by the component 198 in FIG. 1, 3, 14, or 15.

At 920, the first wireless device may transmit a third indicator of the selected third subset of the measured plurality of sets of positioning signals. For example, 920 may be performed by the wireless device 602 in FIG. 6, which may transmit the set of reports 626, which may include an indicator of the selected third subset of the measured plurality of sets of positioning signals. In some aspects, the wireless device 602 may transmit the third subset without the first and second subsets (e.g., the best N measurements that satisfy a threshold, and no other measurements). Moreover, 920 may be performed by the component 198 in FIG. 1, 3, 14, or 15.

Figure 10:
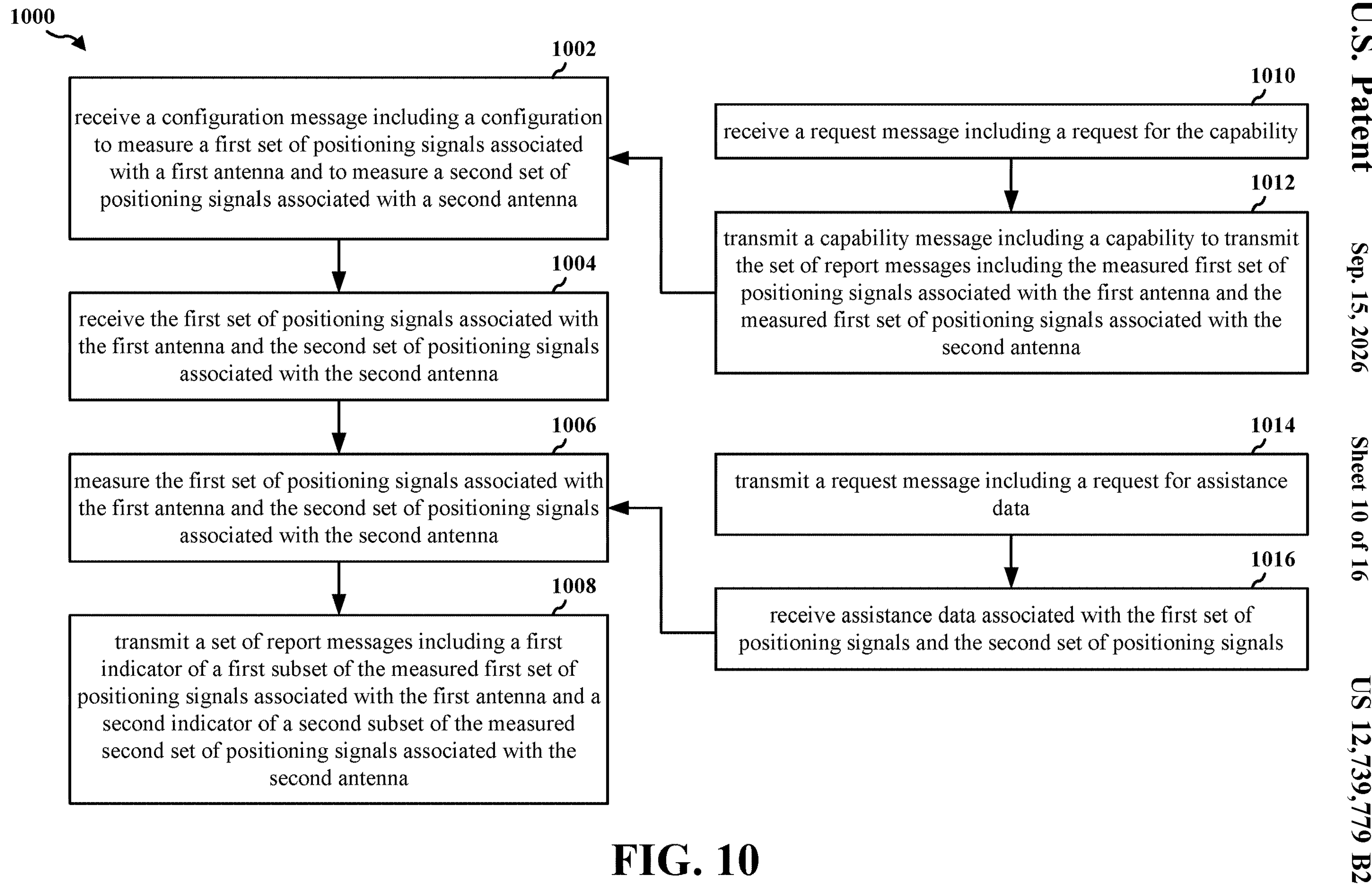
FIG. 10 is a flowchart of a method of wireless communication.

FIG. 10 is a flowchart 1000 of a method of wireless communication. The method may be performed by a first wireless device (e.g., the UE 104, the UE 350; the base station 102, the base station 310; the wireless device 510, the wireless device 602; the apparatus 1404; the network entity 1402, the network entity 1502). At 1002, the first wireless device may receive a configuration message including a configuration to measure a first set of positioning signals associated with a first antenna and to measure a second set of positioning signals associated with a second antenna. For example, 1002 may be performed by the wireless device 602 in FIG. 6, which may receive the set of configurations 614. The set of configurations 614 may include a configuration for the wireless device 602 to measure a first set of positioning signals associated with a first antenna and to measure a second set of positioning signals associated with a second antenna. The set of positioning signals 622 may include the first set of positioning signals and the second set of positioning signals. Moreover, 1002 may be performed by the component 198 in FIG. 1, 3, 14, or 15.

At 1004, the first wireless device may receive the first set of positioning signals associated with the first antenna and the second set of positioning signals associated with the second antenna. For example, 1004 may be performed by the wireless device 602 in FIG. 6, which may receive the set of positioning signals 622. The set of positioning signals 622 may include the first set of positioning signals associated with the first antenna and the second set of positioning signals associated with the second antenna. The first set of positioning signals and the second set of positioning signals may include at least one of a PRS, a CSI-RS, a TRS, an SSB, or an SRS. Moreover, 1004 may be performed by the component 198 in FIG. 1, 3, 14, or 15.

At 1006, the first wireless device may measure the first set of positioning signals associated with the first antenna and the second set of positioning signals associated with the second antenna. For example, 1006 may be performed by the wireless device 602 in FIG. 6, which may, at 624, measure the set of positioning signals 622. The set of positioning signals 622 may include the first set of positioning signals associated with the first antenna and the second set of positioning signals associated with the second antenna. Moreover, 1006 may be performed by the component 198 in FIG. 1, 3, 14, or 15.

At 1008, the first wireless device may transmit a set of report messages including a first indicator of a first subset of the measured first set of positioning signals associated with the first antenna and a second indicator of a second subset of the measured second set of positioning signals associated with the second antenna. For example, 1008 may be performed by the wireless device 602 in FIG. 6, which may transmit the set of reports 626 to the network entity 606. The set of reports 626 may include a first indicator of a first subset of the measured first set of positioning signals associated with the first antenna and a second indicator of a second subset of the measured second set of positioning signals associated with the second antenna. Moreover, 1008 may be performed by the component 198 in FIG. 1, 3, 14, or 15.

At 1010, the first wireless device may receive a request message including a request for the capability. For example, 1010 may be performed by the wireless device 602 in FIG. 6, which may receive the capability request 608 from the network entity 606. The capability request 608 may include an indicator of a request for the wireless device 602 to provide its capability to the network entity 606. Moreover, 1010 may be performed by the component 198 in FIG. 1, 3, 14, or 15.

At 1012, the first wireless device may transmit a capability message including a capability to transmit the set of report messages including the measured first set of positioning signals associated with the first antenna and the measured second set of positioning signals associated with the second antenna. The capability may include at least one of: (a) a third indicator of a maximum number of antennas to include in a report message of the set of report messages, (b) a fourth indicator of a set of ranking metrics to associate with the report message of the set of report messages, or (c) a fifth indicator of a set of measurement types to associate with the report message of the set of report messages. The set of measurement types may include at least one of: (a) an RSTD measurement; (b) an LOS measurement; (c) an RSRP measurement; (d) an RSRPP measurement; (e) an AoD measurement; (f) a CIR measurement; (g) a CFR measurement; (h) a PDP measurement; or (i) a delay profile measurement. The capability message may include an LPP message. For example, 1012 may be performed by the wireless device 602 in FIG. 6, which may transmit set of capability indicators 610 to the network entity 606. The set of capability indicators 610 may include an indicator of a capability for the wireless device 602 to transmit the set of reports 626 including the measured first set of positioning signals associated with the first antenna and the measured second set of positioning signals associated with the second antenna. In other words, the set of capability indicators 610 may indicate to the network entity 606 that the wireless device 602 is capable of performing antenna-level measurements. In some aspects, the wireless device 602 may transmit the set of capability indicators 610 in response to receiving the capability request 608. In other aspects, the wireless device 602 may transmit, or broadcast, the set of capability indicators 610, for example periodically in accordance with a schedule. In some aspects, a network node may schedule the periodic broadcast of the set of capability indicators 610. The capability may include (a) an indicator of a maximum number of antennas that the wireless device 602 is capable of including in a report message of the set of reports 626, (b) an indicator of a set of ranking metrics that the wireless device 602 is capable of using to rank the measurements taken at 624, and/or (c) an indicator of a set of measurement types that the wireless device 602 is capable of measuring at 624. The set of measurement types may include at least one of: (a) an RSTD measurement; (b) an LOS measurement; (c) an RSRP measurement; (d) an RSRPP measurement; (e) an AoD measurement; (f) a CIR measurement; (g) a CFR measurement; (h) a PDP measurement; or (i) a delay profile measurement. The wireless device 602 may transmit an LPP message including the set of capability indicators 610. Moreover, 1012 may be performed by the component 198 in FIG. 1, 3, 14, or 15.

At 1014, the first wireless device may transmit a request message including a request for assistance data. For example, 1014 may be performed by the wireless device 602 in FIG. 6, which may transmit the capability request 608 including a request for assistance data. The transmission of the capability request 608 may be before the reception of the AD 620. Moreover, 1014 may be performed by the component 198 in FIG. 1, 3, 14, or 15.

At 1016, the first wireless device may receive assistance data associated with the first set of positioning signals and the second set of positioning signals. At least one of the measurement of the first set of positioning signals and the second set of positioning signals or the transmission of the set of report messages may be based on the AD. The AD may include at least one of: (a) a third indicator of a set of transmission antennas and a set of reception antennas associated with the first set of positioning signals and the second set of positioning signals; (b) a fourth indicator of a set of ranking metrics to associate with the set of report messages; (c) a fifth indicator of a measurement gap associated with at least one of the first set of positioning signals and the second set of positioning signals; (d) a sixth indicator of a periodicity associated with the set of report messages; (e) a seventh indicator of a quantity associated with the set of report messages; (f) an eighth indicator of an occasion associated with the set of report messages; or (g) a ninth indicator of a measurement type associated with the set of report messages. Receiving the AD may include receiving an LPP message including the AD. For example, 1016 may be performed by the wireless device 602 in FIG. 6, which may receive the AD 620 from the network entity 606. The AD 620 may be associated with the first set of positioning signals and/or the second set of positioning signals of the set of positioning signals 622. The measurement of the first set of positioning signals and the second set of positioning signals at 624 may be based on the AD 620. The transmission of the set of reports 626 (specifically, the contents of a report) may be based on the AD 620. The AD may include at least one of: (a) an indicator of a set of transmission antennas at the wireless device 604 and a set of reception antennas at the wireless device 602 associated with the first set of positioning signals and the second set of positioning signals, (b) an indicator of a set of ranking metrics for the wireless device 602 to use to rank the measurements at 624 and report in the set of reports 626 (*c*) an indicator of a measurement gap used for receiving and measuring the set of positioning signals 622, (d) an indicator of a periodicity that the wireless device 602 may use to periodically transmit the set of reports 626, (e) an indicator of a quantity associated with the set of report messages (e.g., a number of measurements in a report, a number of ranked measurements to report), (f) an indicator of an occasion (e.g., a positioning schedule), or (g) an indicator of a measurement type for the wireless device 602 to measure at 624. The wireless device 602 may receive an LPP message including the AD 620 from the network entity 606. Moreover, 1016 may be performed by the component 198 in FIG. 1, 3, 14, or 15.

Figure 11:
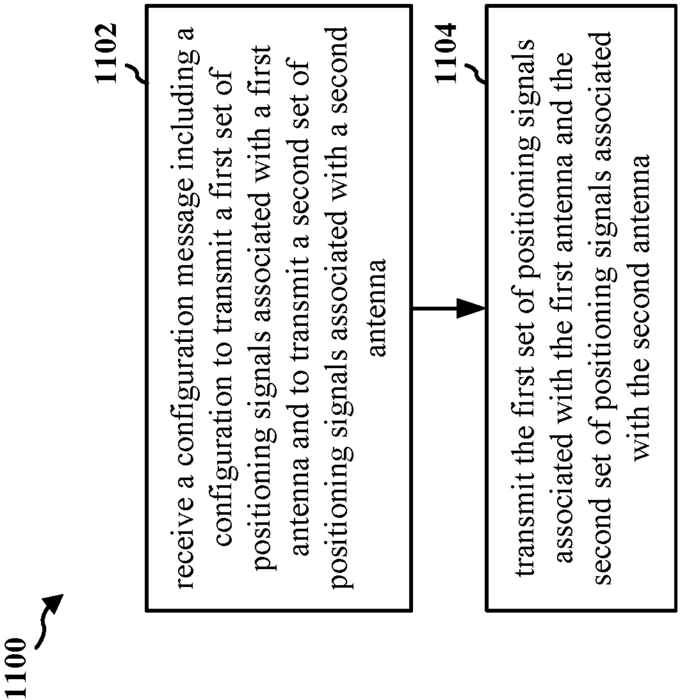
FIG. 11 is a flowchart of a method of wireless communication.

FIG. 11 is a flowchart 1100 of a method of wireless communication. The method may be performed by a second wireless device (e.g., the UE 104, the UE 350; the base station 102, the base station 310; the wireless device 520, the wireless device 604; the apparatus 1404; the network entity 1402, the network entity 1502, the network entity 1660). At 1102, the second wireless device may receive a configuration message including a configuration to transmit a first set of positioning signals associated with a first antenna and to transmit a second set of positioning signals associated with a second antenna. For example, 1102 may be performed by the wireless device 604 in FIG. 6, which may receive the set of configurations 616. The set of configurations 616 may include a configuration to transmit the set of positioning signals 622. The set of positioning signals 622 may include a first set of positioning signals associated with a first antenna and a second set of positioning signals associated with a second antenna. Moreover, 1102 may be performed by the component 199 in FIG. 1, 3, 14, or 15.

At 1104, the second wireless device may transmit the first set of positioning signals associated with the first antenna and the second set of positioning signals associated with the second antenna. For example, 1104 may be performed by the wireless device 604 in FIG. 6, which may transmit the set of positioning signals 622. The set of positioning signals 622 may include the first set of positioning signals associated with the first antenna and the second set of positioning signals associated with the second antenna. Moreover, 1104 may be performed by the component 199 in FIG. 1, 3, 14, or 15.

Figure 12:
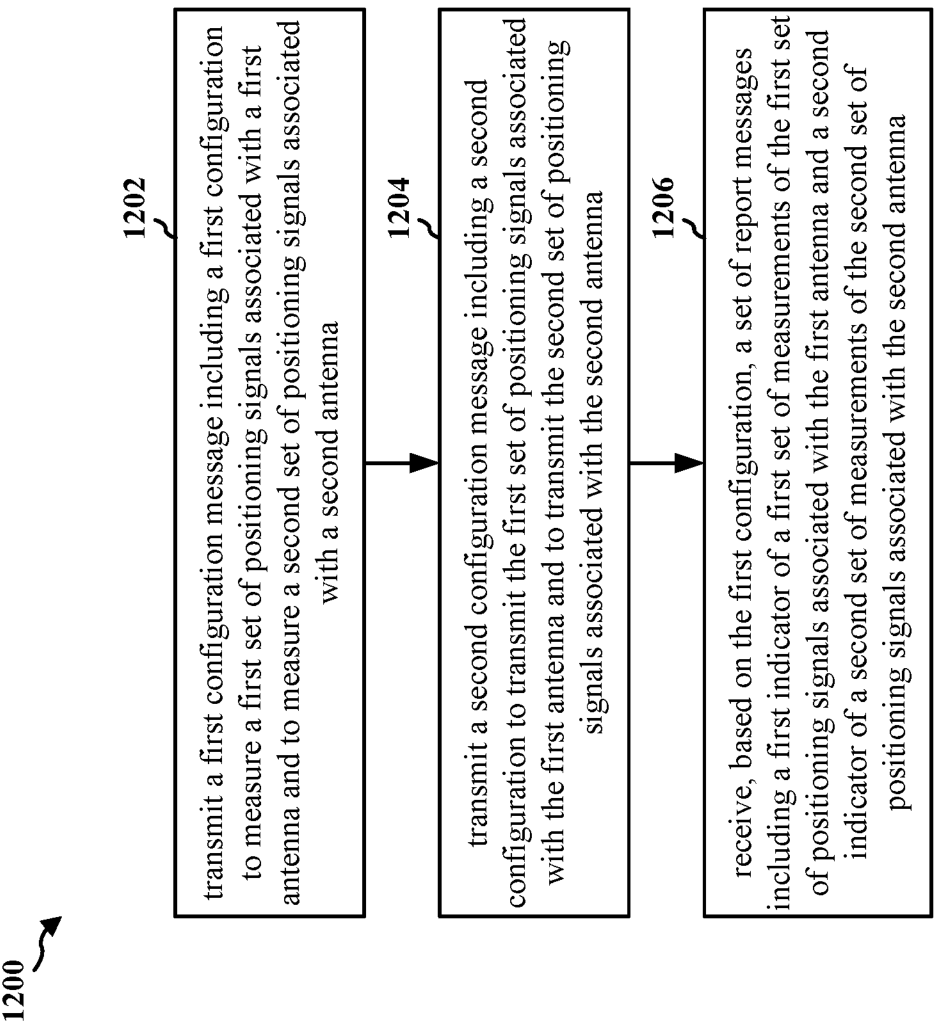
FIG. 12 is a flowchart of a method of wireless communication.

FIG. 12 is a flowchart 1200 of a method of wireless communication. The method may be performed by a network entity (e.g., the base station 102, the base station 310; the core network 120; the LMF 166; the network entity 606, the network entity 1402, the network entity 1502, the network entity 1660). At 1202, the network entity may transmit a first configuration message including a first configuration to measure a first set of positioning signals associated with a first antenna and to measure a second set of positioning signals associated with a second antenna. In one aspect, the first antenna may include a first transmission antenna for a first transmission of the first set of positioning signals and the second antenna may include a second transmission antenna for a second transmission of the second set of positioning signals. In another aspect, the first antenna may include a first reception antenna for a first reception of the first set of positioning signals and the second antenna may include a second reception antenna for a second reception of the second set of positioning signals. For example, 1202 may be performed by the network entity 606 in FIG. 6, which may transmit the set of configurations 614. The set of configurations 614 may include a first configuration to measure the set of positioning signals 622. The set of positioning signals 622 may include a first set of positioning signals associated with a first antenna and a second set of positioning signals associated with a second antenna. In one aspect, the first antenna may include a first transmission antenna at the wireless device 604 for a first transmission of the first set of positioning signals and the second antenna may include a second transmission antenna at the wireless device 604 for a second transmission of the second set of positioning signals. For example, the wireless device 520 in FIG. 5A has a first transmission antenna as the antenna 522 and the wireless device 520 has a second transmission antenna as the antenna 524. In another aspect, the first antenna may include a first reception antenna at the wireless device 602 for a first reception of the first set of positioning signals and the second antenna may include a second reception antenna at the wireless device 602 for a second reception of the second set of positioning signals. For example, the wireless device 510 in FIG. 5A has a first reception antenna as the antenna 512 and the wireless device 510 has a second reception antenna as the antenna 514. Moreover, 1202 may be performed by the component 197 in FIG. 1, 3, 15, or 16.

At 1204, the network entity may transmit a second configuration message including a second configuration to transmit the first set of positioning signals associated with the first antenna and to transmit the second set of positioning signals associated with the second antenna. For example, 1204 may be performed by the network entity 606 in FIG. 6, which may transmit the set of configurations 616. The set of configurations 616 may include a second configuration to transmit the set of positioning signals 622. The set of positioning signals 622 may include the first set of positioning signals associated with the first antenna and to transmit the second set of positioning signals associated with the second antenna. Moreover, 1204 may be performed by the component 197 in FIG. 1, 3, 15, or 16.

At 1206, the network entity may receive, based on the first configuration, a set of report messages including a first indicator of a first set of measurements of the first set of positioning signals associated with the first antenna and a second indicator of a second set of measurements of the second set of positioning signals associated with the second antenna. The first set of measurements and the second set of measurements may include at least one of: (1) an SNR satisfying a first threshold range, (2) an RSRP satisfying a second threshold range, (3) a LOS probability satisfying a third threshold range, (4) a ToA satisfying a fourth threshold range, (5) an RSTD satisfying a fifth threshold range, (6) a delay spread satisfying a sixth threshold range, or (7) a Rician factor satisfying a seventh threshold range. The network entity may transmit a third configuration including at least one of: (a) a third indicator of the first threshold range; (b) a fourth indicator of the second threshold range; (c) a fifth indicator of the third threshold range; a sixth indicator of the fourth threshold range; (d) a seventh indicator of the fifth threshold range; (e) an eighth indicator of the sixth threshold range; or (f) a ninth indicator of the seventh threshold range. For example, 1206 may be performed by the network entity 606 in FIG. 6, which may receive, based on the set of configurations 614, the set of reports 626 from the wireless device 602. The set of reports 626 may include a first indicator of a first set of measurements of the first set of positioning signals associated with the first antenna and a second indicator of a second set of measurements of the second set of positioning signals associated with the second antenna. The first set of measurements and the second set of measurements may include at least one of: (1) an SNR satisfying a first threshold range, (2) an RSRP satisfying a second threshold range, (3) a LOS probability satisfying a third threshold range, (4) a ToA satisfying a fourth threshold range, (5) an RSTD satisfying a fifth threshold range, (6) a delay spread satisfying a sixth threshold range, or (7) a Rician factor satisfying a seventh threshold range. The network entity 606 may transmit, in the set of configurations 614, (a) a third indicator of the first threshold range, (b) a fourth indicator of the second threshold range, (c) a fifth indicator of the third threshold range, (d) a sixth indicator of the fourth threshold range, (e) a seventh indicator of the fifth threshold range, (f) an eighth indicator of the sixth threshold range, and/or (g) a ninth indicator of the seventh threshold range. Moreover, 1206 may be performed by the component 197 in FIG. 1, 3, 15, or 16.

Figure 13:
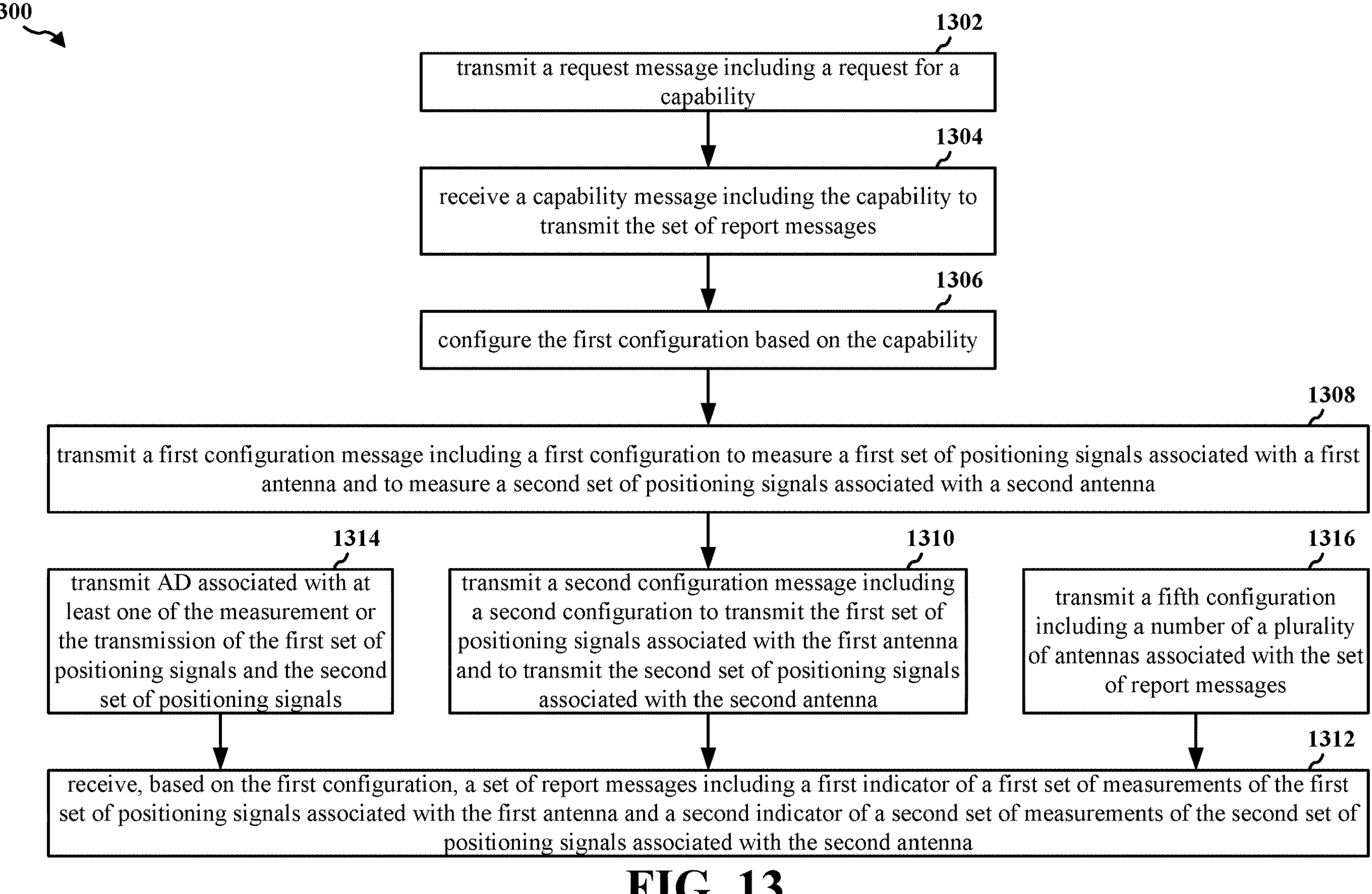
FIG. 13 is a flowchart of a method of wireless communication.

FIG. 13 is a flowchart 1300 of a method of wireless communication. The method may be performed by a network entity (e.g., the base station 102, the base station 310; the core network 130; the LMF 166; the network entity 606, the network entity 1402, the network entity 1502, the network entity 1660). At 1302, the network entity may transmit a request message including a request for a capability. For example, 1302 may be performed by the network entity 606 in FIG. 6, which may transmit the capability request 608 to the wireless device 602. The capability request 608 may include an indicator of a request for the wireless device 602 to provide its capability. The network entity 606 may transmit the capability request 608 before receiving the set of capability indicators 610. Moreover, 1302 may be performed by the component 197 in FIG. 1, 3, 15, or 16.

At 1304, the network entity may receive a capability message including the capability to transmit the set of report messages. For example, 1304 may be performed by the network entity 606 in FIG. 6, which may receive set of capability indicators 610 from the wireless device 602. The set of capability indicators 610 may include an indicator of the wireless device 602's capability to transmit the set of reports 626 that include antenna-level measurements. Moreover, 1304 may be performed by the component 197 in FIG. 1, 3, 15, or 16.

At 1306, the network entity may configure the first configuration based on the capability. For example, 1306 may be performed by the network entity 606 in FIG. 6, which may, at 612, configure the set of configurations 614 based on the set of capability indicators 610. Moreover, 1306 may be performed by the component 197 in FIG. 1, 3, 15, or 16.

At 1308, the network entity may transmit a first configuration message including a first configuration to measure a first set of positioning signals associated with a first antenna and to measure a second set of positioning signals associated with a second antenna. For example, 1308 may be performed by the network entity 606 in FIG. 6, which may transmit the set of configurations 614. The set of configurations 614 may include a first configuration to measure the set of positioning signals 622. The set of positioning signals 622 may include a first set of positioning signals associated with a first antenna and to measure a second set of positioning signals associated with a second antenna. Moreover, 1308 may be performed by the component 197 in FIG. 1, 3, 15, or 16.

At 1310, the network entity may transmit a second configuration message including a second configuration to transmit the first set of positioning signals associated with the first antenna and to transmit the second set of positioning signals associated with the second antenna. For example, 1310 may be performed by the network entity 606 in FIG. 6, which may transmit the set of configurations 616. The set of configurations 616 may include a second configuration to transmit the set of positioning signals 622. The set of positioning signals 622 may include the first set of positioning signals associated with the first antenna and to transmit the second set of positioning signals associated with the second antenna. Moreover, 1310 may be performed by the component 197 in FIG. 1, 3, 15, or 16.

At 1312, the network entity may receive, based on the first configuration, a set of report messages including a first indicator of a first set of measurements of the first set of positioning signals associated with the first antenna and a second indicator of a second set of measurements of the second set of positioning signals associated with the second antenna. For example, 1312 may be performed by the network entity 606 in FIG. 6, which may receive, based on the set of configurations 614, the set of reports 626 from the wireless device 602. The set of reports 626 may include a first indicator of a first set of measurements of the first set of positioning signals associated with the first antenna and a second indicator of a second set of measurements of the second set of positioning signals associated with the second antenna. Moreover, 1312 may be performed by the component 197 in FIG. 1, 3, 15, or 16.

At 1314, the network entity may transmit AD associated with at least one of the measurement or the transmission of the first set of positioning signals and the second set of positioning signals. The AD may include at least one of: (a) a third indicator of a set of transmission antennas and a set of reception antennas associated with the first set of positioning signals and the second set of positioning signals, (b) a fourth indicator of a set of ranking metrics to associate with the set of report messages, (c) a fifth indicator of a measurement gap associated with at least one of the first set of positioning signals and the second set of positioning signals, (d) a sixth indicator of a periodicity associated with the set of report messages, (e) a seventh indicator of a quantity associated with the set of report messages, (f) an eighth indicator of an occasion associated with the set of report messages, or (g) a ninth indicator of a measurement type associated with the set of report messages. The network entity may transmit an LPP message including the AD. For example, 1314 may be performed by the network entity 606 in FIG. 6, which may transmit the AD 620 associated with at least one of the measurement at 624 or the transmission of the first set of positioning signals and the second set of positioning signals as the set of reports 626. In other words, the AD 620 may help to configure at least some of the wireless device 602's measurement and/or reporting. The AD may include at least one of: (a) an indicator of a set of transmission antennas at the wireless device 604 and a set of reception antennas at the wireless device 602 associated with the first set of positioning signals and the second set of positioning signals, (b) an indicator of a set of ranking metrics for the wireless device 602 to use to rank the measurements at 624 and report in the set of reports 626 (*c*) an indicator of a measurement gap used for receiving and measuring the set of positioning signals 622, (d) an indicator of a periodicity that the wireless device 602 may use to periodically transmit the set of reports 626, (e) an indicator of a quantity associated with the set of report messages (e.g., a number of measurements in a report, a number of ranked measurements to report), (f) an indicator of an occasion (e.g., a positioning schedule), or (g) an indicator of a measurement type for the wireless device 602 to measure at 624. The network entity 606 may transmit an LPP measure including the AD 620 to the wireless device 602. Moreover, 1314 may be performed by the component 197 in FIG. 1, 3, 15, or 16.

At 1316, the network entity may transmit a fifth configuration including a number of a plurality of antennas associated with the set of report messages. The first configuration message may include a third configuration to measure a plurality of sets of positioning signals. The plurality of sets of positioning signals may include the first set of positioning signals and the second set of positioning signals. The first antenna and the second antenna may be included in the plurality of antennas. Each set of the plurality of sets of positioning signals may be associated with an antenna of the plurality of antennas. The second configuration message may include a fourth configuration to transmit the plurality of sets of positioning signals. The set of report messages may include a third subset of the measured plurality of sets of positioning signals associated with the number of the plurality of antennas. For example, 1316 may be performed by the network entity 606 in FIG. 6, which may transmit the set of configurations 614 to the wireless device 602. The set of configurations 614 may include an indicator of a number of a plurality of antennas for the wireless device 602 to report in the set of reports 626. The set of configurations 614 may include an indicator for the wireless device 602 to measure a plurality of sets of positioning signals of the set of positioning signals 622. The plurality of sets of positioning signals may include the first set of positioning signals and the second set of positioning signals. The first antenna and the second antenna may be included in the plurality of antennas. Each set of the plurality of sets of positioning signals may be associated with an antenna of the plurality of antennas (i.e., each antenna may be associated with a set of the plurality of sets of positioning signals). The set of configurations 616 may include an indicator for the wireless device 604 to transmit the plurality of sets of positioning signals as the set of positioning signals 622. The set of reports 626 may include a subset of the measured plurality of sets of positioning signals associated with the number of the plurality of antennas. In other words, the network entity 606 may instruct the wireless device 602, via the set of configurations 614, to transmit measurements associated with the number of the plurality of antennas, and not to transmit measurements associated with the others of the plurality of antennas. Moreover, 1316 may be performed by the component 197 in FIG. 1, 3, 15, or 16.

Figure 14:
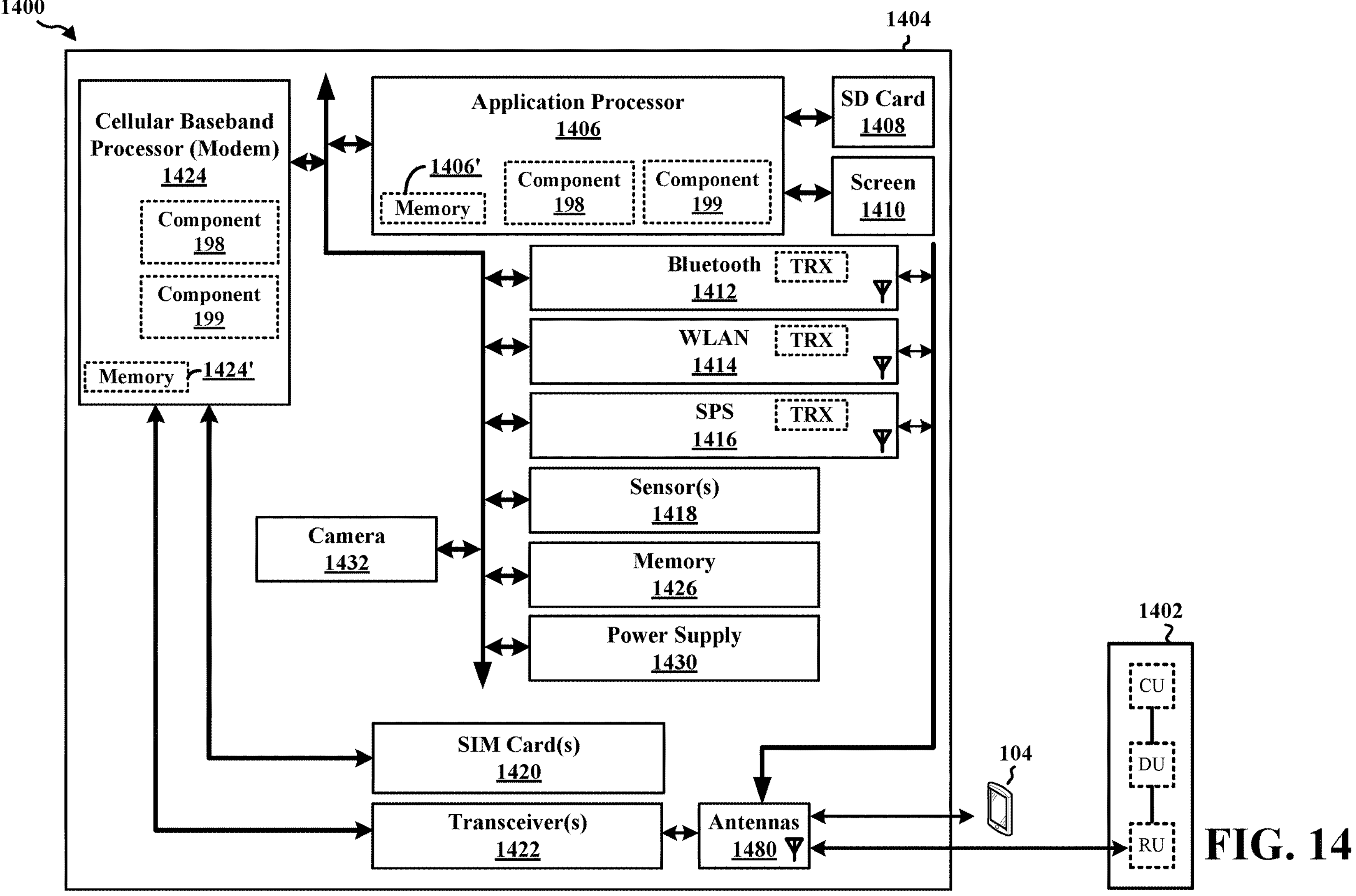
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1424/application processor(s) 1406 when executing software. The cellular baseband processor (s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the component 198 may be configured to receive a configuration message including a configuration to measure a first set of positioning signals associated with a first antenna and to measure a second set of positioning signals associated with a second antenna. The component 198 may be configured to receive the first set of positioning signals associated with the first antenna and the second set of positioning signals associated with the second antenna. The component 198 may be configured to measure the first set of positioning signals associated with the first antenna and the second set of positioning signals associated with the second antenna. The component 198 may be configured to transmit a set of report messages including a first indicator of a first subset of the measured first set of positioning signals associated with the first antenna and a second indicator of a second subset of the measured second set of positioning signals associated with the second antenna. The component 198 may be within the cellular baseband processor(s) 1424, the application processor(s) 1406, or both the cellular baseband processor(s) 1424 and the application processor(s) 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor (s) 1406, may include means for receiving a configuration message including a configuration to measure a first set of positioning signals associated with a first antenna and to measure a second set of positioning signals associated with a second antenna. The apparatus 1404 may include means for receiving the first set of positioning signals associated with the first antenna and the second set of positioning signals associated with the second antenna. The apparatus 1404 may include means for measuring the first set of positioning signals associated with the first antenna and the second set of positioning signals associated with the second antenna. The apparatus 1404 may include means for transmitting a set of report messages including a first indicator of a first subset of the measured first set of positioning signals associated with the first antenna and a second indicator of a second subset of the measured second set of positioning signals associated with the second antenna. The apparatus 1404 may include means for receiving the first set of positioning signals associated with the first antenna and the second set of positioning signals associated with the second antenna by receiving the first set of positioning signals via the first antenna and the second set of positioning signals via the second antenna. The apparatus 1404 may include the first antenna and the second antenna. The apparatus 1404 may include means for receiving the first set of positioning signals associated with the first antenna and the second set of positioning signals associated with the second antenna by receiving the first set of positioning signals from the first antenna and the second set of positioning signals from the second antenna. A second wireless device may include the first antenna and the second antenna. The second wireless device may include a third antenna. The apparatus 1404 may include means for receiving the first set of positioning signals via the first antenna and the second set of positioning signals via the second antenna (a) by receiving, via the first antenna, the first set of positioning signals from the third antenna, and (b) by receiving, via the second antenna, the second set of positioning signals from the third antenna. The apparatus 1404 may include the third antenna. The apparatus 1404 may include means for receiving the first set of positioning signals from the first antenna and the second set of positioning signals from the second antenna (a) by receiving, via the third antenna, the first set of positioning signals from the first antenna and (b) by receiving, via the third antenna, the second set of positioning signals from the second antenna. The apparatus 1404 may include means for transmitting the set of report messages including the first indicator of the first subset of the measured first set of positioning signals associated with the first antenna and the second indicator of the second subset of the measured second set of positioning signals associated with the second antenna by: (a) selecting, for the transmission, at least one of the first subset of the measured first set of positioning signals associated with the first antenna or the second subset of the measured second set of positioning signals associated with the second antenna based on at least one of (1) an SNR satisfying a first threshold range, (2) an RSRP satisfying a second threshold range, (3) a LOS probability satisfying a third threshold range, (4) a ToA satisfying a fourth threshold range, (5) an RSTD satisfying a fifth threshold range, (6) a delay spread satisfying a sixth threshold range, or (7) a Rician factor satisfying a seventh threshold range; and (b) transmitting the selected at least one of the first subset of the measured first set of positioning signals associated with the first antenna or the second subset of the measured second set of positioning signals associated with the second antenna. The apparatus 1404 may include means for receiving a second configuration including at least one of (a) a third indicator of the first threshold range, (b) a fourth indicator of the second threshold range, (c) a fifth indicator of the third threshold range, (d) a sixth indicator of the fourth threshold range, (e) a seventh indicator of the fifth threshold range, (f) an eighth indicator of the sixth threshold range, or (g) a ninth indicator of the seventh threshold range. The apparatus 1404 may include means for receiving the second configuration by receiving a second configuration message including the second configuration, or by receiving the configuration message including the second configuration. The apparatus 1404 may include means for receiving the first set of positioning signals associated with the first antenna and the second set of positioning signals associated with the second antenna by receiving a plurality of sets of positioning signals. The plurality of sets of positioning signals may include the first set of positioning signals and the second set of positioning signals. The first antenna and the second antenna may be included in a plurality of antennas. Each set of the plurality of sets of positioning signals may be associated with an antenna of the plurality of antennas. Measuring the first set of positioning signals associated with the first antenna and the second set of positioning signals associated with the second antenna may include measuring the plurality of sets of positioning signals. The apparatus 1404 may include means for transmitting the set of report messages including the first indicator of the first subset of the measured first set of positioning signals associated with the first antenna and the second indicator of the second subset of the measured second set of positioning signals associated with the second antenna by: (a) ranking the measured plurality of sets of positioning signals by each associated antenna of the plurality of antennas based on at least one of (1) an SNR, (2) an RSRP, (3) a LOS probability, (4) a ToA, (5) an RSTD, (6) a delay spread, or (7) a Rician factor; (b) selecting, for the transmission, a third subset of the measured plurality of sets of positioning signals associated with a number of the plurality of antennas based on the ranking; and (c) transmitting a third indicator of the selected third subset of the measured plurality of sets of positioning signals. The selected third subset of the measured plurality of sets of positioning signals may include the first subset of the measured first set of positioning signals and the second subset of the measured second set of positioning signals. The apparatus 1404 may include means for receiving a second configuration message including at least one of the plurality of antennas. The apparatus 1404 may include means for transmitting a capability message including a capability to transmit the set of report messages including the measured first set of positioning signals associated with the first antenna and the measured second set of positioning signals associated with the second antenna. The configuration may be based on the capability. The apparatus 1404 may include means for receiving a request message including a request for the capability. The transmission of the capability message may be in response to the reception of the request message. The capability may include at least one of: (a) a third indicator of a maximum number of antennas to include in a report message of the set of report messages; (b) a fourth indicator of a set of ranking metrics to associate with the report message of the set of report messages; or (c) a fifth indicator of a set of measurement types to associate with the report message of the set of report messages. The set of measurement types may include at least one of: (a) an RSTD measurement; (b) an LOS measurement; (c) an RSRP measurement; (d) an RSRPP measurement; (e) an AoD measurement; (f) a CIR measurement; (g) a CFR measurement; (h) a PDP measurement; or (i) a delay profile measurement. The capability message may include an LPP message. The apparatus 1404 may include means for receiving AD associated with the first set of positioning signals and the second set of positioning signals. At least one of the measurement of the first set of positioning signals and the second set of positioning signals or the transmission of the set of report messages may be based on the AD. The AD may include at least one of: (a) a third indicator of a set of transmission antennas and a set of reception antennas associated with the first set of positioning signals and the second set of positioning signals; (b) a fourth indicator of a set of ranking metrics to associate with the set of report messages; (c) a fifth indicator of a measurement gap associated with at least one of the first set of positioning signals and the second set of positioning signals; (d) a sixth indicator of a periodicity associated with the set of report messages; (e) a seventh indicator of a quantity associated with the set of report messages; (f) an eighth indicator of an occasion associated with the set of report messages; or (g) a ninth indicator of a measurement type associated with the set of report messages. The apparatus 1404 may include means for transmitting a request message including a request for the AD before the reception of the AD. The apparatus 1404 may include means for receiving the AD by receiving an LPP message including the AD. The first set of positioning signals and the second set of positioning signals may include at least one of a PRS, an SRS, a CSI-RS, a TRS, or an SSB. The apparatus 1404 may include a UE. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the component 199 may be configured to receive a configuration message including a configuration to transmit a first set of positioning signals associated with a first antenna and to transmit a second set of positioning signals associated with a second antenna. The component 199 may be configured to transmit the first set of positioning signals associated with the first antenna and the second set of positioning signals associated with the second antenna. The component 199 may be within the cellular baseband processor(s) 1424, the application processor(s) 1406, or both the cellular baseband processor(s) 1424 and the application processor(s) 1406. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor (s) 1406, may include means for receiving a configuration message including a configuration to transmit a first set of positioning signals associated with a first antenna and to transmit a second set of positioning signals associated with a second antenna. The apparatus 1404 may include means for transmitting the first set of positioning signals associated with the first antenna and the second set of positioning signals associated with the second antenna. The apparatus 1404 may include means for transmitting the first set of positioning signals and the second set of positioning signals by transmitting the first and second sets of positioning signals to a first wireless device. The apparatus 1404 may include means for transmitting the first set of positioning signals associated with the first antenna and the second set of positioning signals associated with the second antenna by transmitting the first set of positioning signals via the first antenna and the second set of positioning signals via the second antenna or by transmitting the first set of positioning signals to the first antenna and the second set of positioning signals to the second antenna. The second wireless device may include the first antenna and the second antenna. A second wireless device may include the first antenna and the second antenna. The second wireless device may include a third antenna. The apparatus 1404 may include means for transmitting the first set of positioning signals to the first antenna and the second set of positioning signals to the second antenna by: (a) transmitting, via the third antenna, the first set of positioning signals to the first antenna; and (b) transmitting, via the third antenna, the second set of positioning signals to the second antenna. The second wireless device may include a third antenna. The apparatus 1404 may include means for transmitting the first set of positioning signals via the first antenna and the second set of positioning signals via the second antenna by: (a) transmitting, via the first antenna, the first set of positioning signals to the third antenna; and (b) transmitting, via the second antenna, the second set of positioning signals to the third antenna. The apparatus 1404 may include means for receiving AD associated with the first set of positioning signals and the second set of positioning signals. Transmitting the first set of positioning signals and the second set of positioning signals may be based on the AD. The first set of positioning signals and the second set of positioning signals may include at least one of: (a) a PRS; (b) a CSI-RS; (c) an SSB; (d) an SRS; or (e) a TRS. The means may be the component 199 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
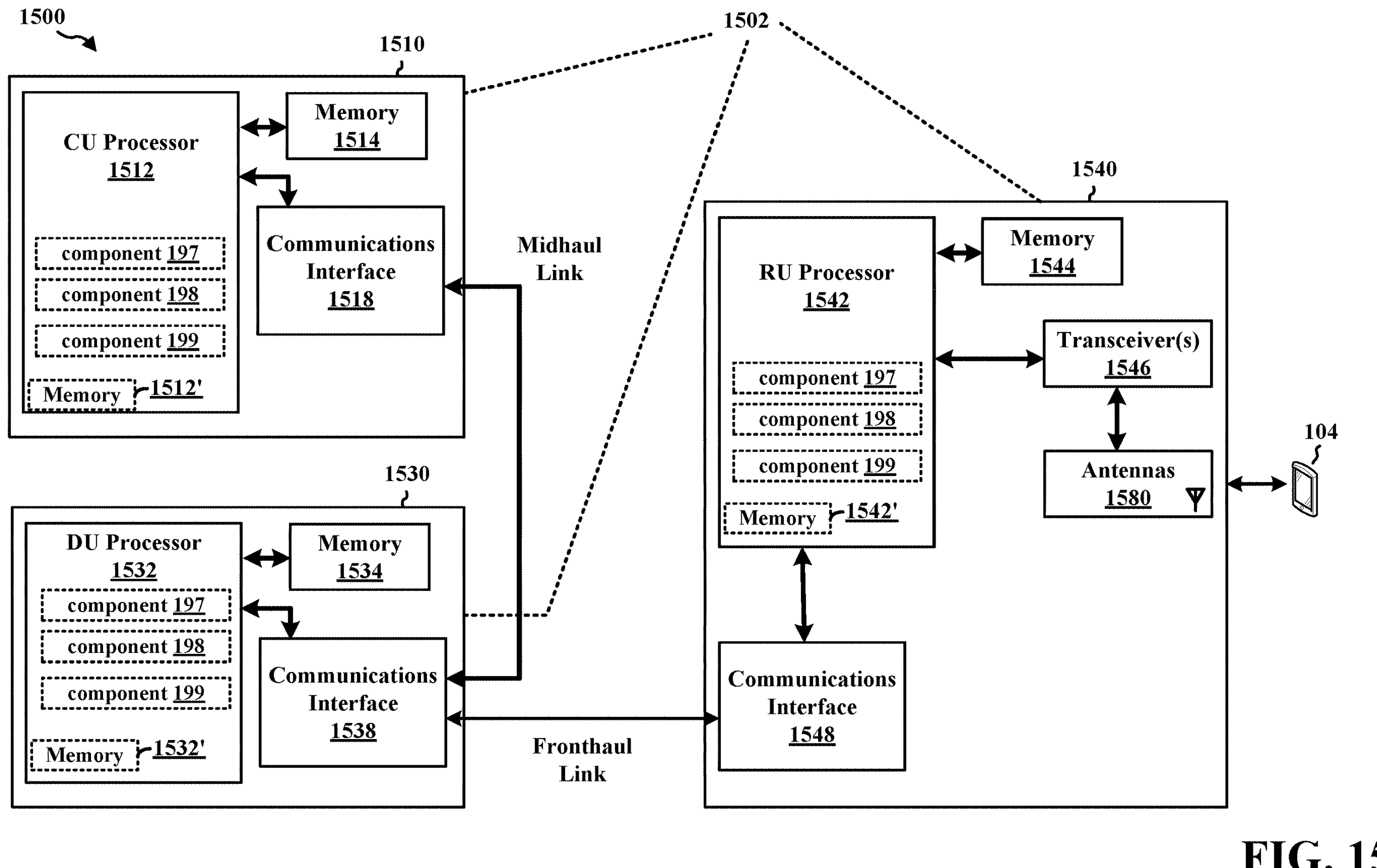
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include at least one CU processor 1512. The CU processor(s) 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include at least one DU processor 1532. The DU processor(s) 1532 may include on-chip memory 1532'. In some aspects, the DU 1530 may further include additional memory modules 1534 and a communications interface 1538. The DU 1530 communicates with the RU 1540 through a fronthaul link. The RU 1540 may include at least one RU processor 1542. The RU processor(s) 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a configuration message including a configuration to measure a first set of positioning signals associated with a first antenna and to measure a second set of positioning signals associated with a second antenna. The component 198 may be configured to receive the first set of positioning signals associated with the first antenna and the second set of positioning signals associated with the second antenna. The component 198 may be configured to measure the first set of positioning signals associated with the first antenna and the second set of positioning signals associated with the second antenna. The component 198 may be configured to transmit a set of report messages including a first indicator of a first subset of the measured first set of positioning signals associated with the first antenna and a second indicator of a second subset of the measured second set of positioning signals associated with the second antenna. The component 198 may be within one or more processors of one or more of the CU 1510, DU 1530, and the RU 1540. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1502 may include a variety of components configured for various functions. In one configuration, the network entity 1502 may include means for receiving a configuration message including a configuration to measure a first set of positioning signals associated with a first antenna and to measure a second set of positioning signals associated with a second antenna. The network entity 1502 may include means for receiving the first set of positioning signals associated with the first antenna and the second set of positioning signals associated with the second antenna. The network entity 1502 may include means for measuring the first set of positioning signals associated with the first antenna and the second set of positioning signals associated with the second antenna. The network entity 1502 may include means for transmitting a set of report messages including a first indicator of a first subset of the measured first set of positioning signals associated with the first antenna and a second indicator of a second subset of the measured second set of positioning signals associated with the second antenna. The network entity 1502 may include means for receiving the first set of positioning signals associated with the first antenna and the second set of positioning signals associated with the second antenna by receiving the first set of positioning signals via the first antenna and the second set of positioning signals via the second antenna. The network entity 1502 may include the first antenna and the second antenna. The network entity 1502 may include means for receiving the first set of positioning signals associated with the first antenna and the second set of positioning signals associated with the second antenna by receiving the first set of positioning signals from the first antenna and the second set of positioning signals from the second antenna. A second wireless device may include the first antenna and the second antenna. The second wireless device may include a third antenna. The network entity 1502 may include means for receiving the first set of positioning signals via the first antenna and the second set of positioning signals via the second antenna (a) by receiving, via the first antenna, the first set of positioning signals from the third antenna, and (b) by receiving, via the second antenna, the second set of positioning signals from the third antenna. The network entity 1502 may include the third antenna. The network entity 1502 may include means for receiving the first set of positioning signals from the first antenna and the second set of positioning signals from the second antenna (a) by receiving, via the third antenna, the first set of positioning signals from the first antenna and (b) by receiving, via the third antenna, the second set of positioning signals from the second antenna. The network entity 1502 may include means for transmitting the set of report messages including the first indicator of the first subset of the measured first set of positioning signals associated with the first antenna and the second indicator of the second subset of the measured second set of positioning signals associated with the second antenna by: (a) selecting, for the transmission, at least one of the first subset of the measured first set of positioning signals associated with the first antenna or the second subset of the measured second set of positioning signals associated with the second antenna based on at least one of (1) an SNR satisfying a first threshold range, (2) an RSRP satisfying a second threshold range, (3) a LOS probability satisfying a third threshold range, (4) a ToA satisfying a fourth threshold range, (5) an RSTD satisfying a fifth threshold range, (6) a delay spread satisfying a sixth threshold range, or (7) a Rician factor satisfying a seventh threshold range; and (b) transmitting the selected at least one of the first subset of the measured first set of positioning signals associated with the first antenna or the second subset of the measured second set of positioning signals associated with the second antenna. The network entity 1502 may include means for receiving a second configuration including at least one of (a) a third indicator of the first threshold range, (b) a fourth indicator of the second threshold range, (c) a fifth indicator of the third threshold range, (d) a sixth indicator of the fourth threshold range, (e) a seventh indicator of the fifth threshold range, (f) an eighth indicator of the sixth threshold range, or (g) a ninth indicator of the seventh threshold range. The network entity 1502 may include means for receiving the second configuration by receiving a second configuration message including the second configuration, or by receiving the configuration message including the second configuration. The network entity 1502 may include means for receiving the first set of positioning signals associated with the first antenna and the second set of positioning signals associated with the second antenna by receiving a plurality of sets of positioning signals. The plurality of sets of positioning signals may include the first set of positioning signals and the second set of positioning signals. The first antenna and the second antenna may be included in a plurality of antennas. Each set of the plurality of sets of positioning signals may be associated with an antenna of the plurality of antennas. Measuring the first set of positioning signals associated with the first antenna and the second set of positioning signals associated with the second antenna may include measuring the plurality of sets of positioning signals. The network entity 1502 may include means for transmitting the set of report messages including the first indicator of the first subset of the measured first set of positioning signals associated with the first antenna and the second indicator of the second subset of the measured second set of positioning signals associated with the second antenna by: (a) ranking the measured plurality of sets of positioning signals by each associated antenna of the plurality of antennas based on at least one of (1) an SNR, (2) an RSRP, (3) a LOS probability, (4) a ToA, (5) an RSTD, (6) a delay spread, or (7) a Rician factor; (b) selecting, for the transmission, a third subset of the measured plurality of sets of positioning signals associated with a number of the plurality of antennas based on the ranking; and (c) transmitting a third indicator of the selected third subset of the measured plurality of sets of positioning signals. The selected third subset of the measured plurality of sets of positioning signals may include the first subset of the measured first set of positioning signals and the second subset of the measured second set of positioning signals. The network entity 1502 may include means for receiving a second configuration message including at least one of the plurality of antennas. The network entity 1502 may include means for transmitting a capability message including a capability to transmit the set of report messages including the measured first set of positioning signals associated with the first antenna and the measured second set of positioning signals associated with the second antenna. The configuration may be based on the capability. The network entity 1502 may include means for receiving a request message including a request for the capability. The transmission of the capability message may be in response to the reception of the request message. The capability may include at least one of: (a) a third indicator of a maximum number of antennas to include in a report message of the set of report messages; (b) a fourth indicator of a set of ranking metrics to associate with the report message of the set of report messages; or (c) a fifth indicator of a set of measurement types to associate with the report message of the set of report messages. The set of measurement types may include at least one of: (a) an RSTD measurement; (b) an LOS measurement; (c) an RSRP measurement; (d) an RSRPP measurement; (e) an AoD measurement; (f) a CIR measurement; (g) a CFR measurement; (h) a PDP measurement; or (i) a delay profile measurement. The capability message may include an LPP message. The network entity 1502 may include means for receiving AD associated with the first set of positioning signals and the second set of positioning signals. At least one of the measurement of the first set of positioning signals and the second set of positioning signals or the transmission of the set of report messages may be based on the AD. The AD may include at least one of: (a) a third indicator of a set of transmission antennas and a set of reception antennas associated with the first set of positioning signals and the second set of positioning signals; (b) a fourth indicator of a set of ranking metrics to associate with the set of report messages; (c) a fifth indicator of a measurement gap associated with at least one of the first set of positioning signals and the second set of positioning signals; (d) a sixth indicator of a periodicity associated with the set of report messages; (e) a seventh indicator of a quantity associated with the set of report messages; (f) an eighth indicator of an occasion associated with the set of report messages; or (g) a ninth indicator of a measurement type associated with the set of report messages. The network entity 1502 may include means for transmitting a request message including a request for the AD before the reception of the AD. The network entity 1502 may include means for receiving the AD by receiving an LPP message including the AD. The first set of positioning signals and the second set of positioning signals may include at least one of a PRS, an SRS, a CSI-RS, a TRS, or an SSB. The network entity 1502 may include a base station or a TRP. The means may be the component 198 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 199 may be configured to receive a configuration message including a configuration to transmit a first set of positioning signals associated with a first antenna and to transmit a second set of positioning signals associated with a second antenna. The component 199 may be configured to transmit the first set of positioning signals associated with the first antenna and the second set of positioning signals associated with the second antenna. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1502 may include a variety of components configured for various functions. In one configuration, the network entity 1502 may include means for receiving a configuration message including a configuration to transmit a first set of positioning signals associated with a first antenna and to transmit a second set of positioning signals associated with a second antenna. The network entity 1502 may include means for transmitting the first set of positioning signals associated with the first antenna and the second set of positioning signals associated with the second antenna. The network entity 1502 may include means for transmitting the first set of positioning signals and the second set of positioning signals by transmitting the first and second sets of positioning signals to a first wireless device. The network entity 1502 may include means for transmitting the first set of positioning signals associated with the first antenna and the second set of positioning signals associated with the second antenna by transmitting the first set of positioning signals via the first antenna and the second set of positioning signals via the second antenna or by transmitting the first set of positioning signals to the first antenna and the second set of positioning signals to the second antenna. The second wireless device may include the first antenna and the second antenna. A second wireless device may include the first antenna and the second antenna. The second wireless device may include a third antenna. The network entity 1502 may include means for transmitting the first set of positioning signals to the first antenna and the second set of positioning signals to the second antenna by: (a) transmitting, via the third antenna, the first set of positioning signals to the first antenna; and (b) transmitting, via the third antenna, the second set of positioning signals to the second antenna. The second wireless device may include a third antenna. The network entity 1502 may include means for transmitting the first set of positioning signals via the first antenna and the second set of positioning signals via the second antenna by: (a) transmitting, via the first antenna, the first set of positioning signals to the third antenna; and (b) transmitting, via the second antenna, the second set of positioning signals to the third antenna. The network entity 1502 may include means for receiving AD associated with the first set of positioning signals and the second set of positioning signals. Transmitting the first set of positioning signals and the second set of positioning signals may be based on the AD. The first set of positioning signals and the second set of positioning signals may include at least one of: (a) a PRS; (b) a CSI-RS; (c) an SSB; (d) an SRS; or (e) a TRS. The network entity 1502 may include a TRP. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 197 may be configured to transmit a first configuration message including a first configuration to measure a first set of positioning signals associated with a first antenna and to measure a second set of positioning signals associated with a second antenna. The component 197 may be configured to transmit a second configuration message including a second configuration to transmit the first set of positioning signals associated with the first antenna and to transmit the second set of positioning signals associated with the second antenna. The component 197 may be configured to receive, based on the first configuration, a set of report messages including a first indicator of a first set of measurements of the first set of positioning signals associated with the first antenna and a second indicator of a second set of measurements of the second set of positioning signals associated with the second antenna. The component 197 may be within one or more processors of one or more of the CU 1510, DU 1530, and the RU 1540. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1502 may include a variety of components configured for various functions. In one configuration, the network entity 1502 may include means for transmitting a first configuration message including a first configuration to measure a first set of positioning signals associated with a first antenna and to measure a second set of positioning signals associated with a second antenna. The network entity 1502 may include means for transmitting a second configuration message including a second configuration to transmit the first set of positioning signals associated with the first antenna and to transmit the second set of positioning signals associated with the second antenna. The network entity 1502 may include means for receiving, based on the first configuration, a set of report messages including a first indicator of a first set of measurements of the first set of positioning signals associated with the first antenna and a second indicator of a second set of measurements of the second set of positioning signals associated with the second antenna. The first antenna may include a first transmission antenna for a transmission of the first set of positioning signals and the second antenna includes a second transmission antenna for a transmission of the second set of positioning signals. The first antenna may include a first reception antenna for a reception of the first set of positioning signals and the second antenna includes a second reception antenna for a reception of the second set of positioning signals. The first set of measurements and the second set of measurements may include at least one of: (1) an SNR satisfying a first threshold range, (2) an RSRP satisfying a second threshold range, (3) a LOS probability satisfying a third threshold range, (4) a ToA satisfying a fourth threshold range, (5) an RSTD satisfying a fifth threshold range, (6) a delay spread satisfying a sixth threshold range, or (7) a Rician factor satisfying a seventh threshold range. The network entity 1502 may include means for transmitting a third configuration including at least one of: (a) a third indicator of the first threshold range; (b) a fourth indicator of the second threshold range; (c) a fifth indicator of the third threshold range; (d) a sixth indicator of the fourth threshold range; (e) a seventh indicator of the fifth threshold range; (f) an eighth indicator of the sixth threshold range; or (g) a ninth indicator of the seventh threshold range. The network entity 1502 may include means for transmitting the third configuration by transmitting a third configuration message including the third configuration or by transmitting the first configuration message. The first configuration message may include the third configuration. The first configuration message may include a third configuration to measure a plurality of sets of positioning signals. The plurality of sets of positioning signals may include the first set of positioning signals and the second set of positioning signals. The first antenna and the second antenna may be included in a plurality of antennas. Each set of the plurality of sets of positioning signals may be associated with an antenna of the plurality of antennas. The second configuration message may include a fourth configuration to transmit the plurality of sets of positioning signals. The network entity 1502 may include means for transmitting a third configuration including a number of a plurality of antennas associated with the set of report messages. The set of report messages may include a third subset of the measured plurality of sets of positioning signals associated with the number of the plurality of antennas. The network entity 1502 may include means for receiving a capability message including a capability to transmit the set of report messages. The network entity 1502 may include means for configuring the first configuration based on the capability. The network entity 1502 may include means for transmitting a request message including a request for the capability before the reception of the capability message. The capability may include at least one of: (a) a third indicator of a maximum number of antennas to include in a report message of the set of report messages; (b) a fourth indicator of a set of ranking metrics to associate with the report message of the set of report messages; or (c) a fifth indicator of a set of measurement types to associate with the report message of the set of report messages. The set of measurement types may include at least one of: (a) an RSTD measurement; (b) an LOS measurement; (c) an RSRP measurement; (d) an RSRPP measurement; (e) an AoD measurement; (f) a CIR measurement; (g) a CFR measurement; or (h) a PDP measurement. The capability message may include an LPP message. The network entity 1502 may include means for transmitting AD associated with at least one of the measurement or the transmission of the first set of positioning signals and the second set of positioning signals. The AD may include at least one of: (a) a third indicator of a set of transmission antennas and a set of reception antennas associated with the first set of positioning signals and the second set of positioning signals; (b) a fourth indicator of a set of ranking metrics to associate with the set of report messages; (c) a fifth indicator of a measurement gap associated with at least one of the first set of positioning signals and the second set of positioning signals; (d) a sixth indicator of a periodicity associated with the set of report messages; (e) a seventh indicator of a quantity associated with the set of report messages; (f) an eighth indicator of an occasion associated with the set of report messages; or (g) a ninth indicator of a measurement type associated with the set of report messages. The first set of positioning signals and the second set of positioning signals may include at least one of a PRS, an SRS, a CSI-RS, a TRS, or an SSB. The network entity 1502 may include an LMF. The means may be the component 197 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Figure 16:
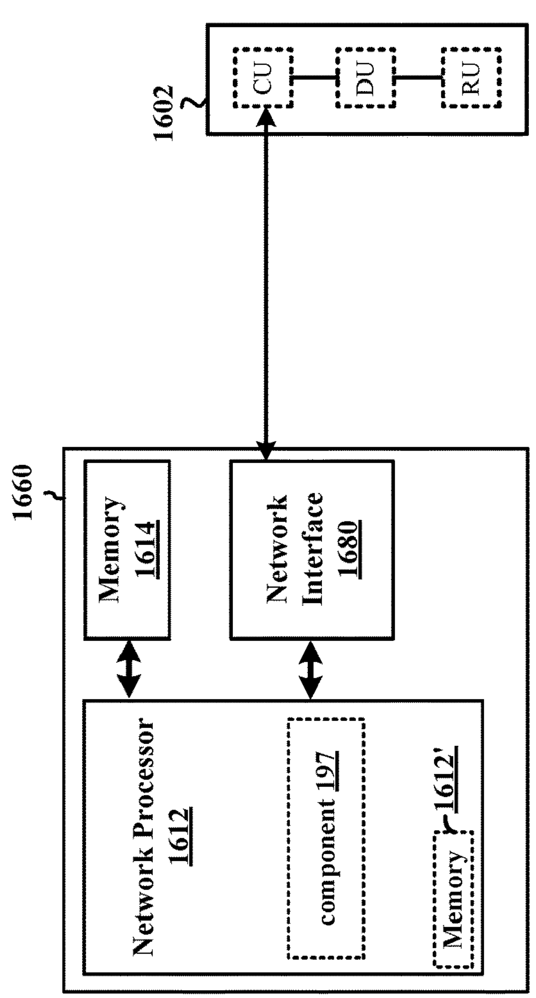
FIG. 16 is a diagram illustrating an example of a hardware implementation for an example network entity.

FIG. 16 is a diagram 1600 illustrating an example of a hardware implementation for a network entity 1660. In one example, the network entity 1660 may be within the core network 120. The network entity 1660 may include at least one network processor 1612. The network processor(s) 1612 may include on-chip memory 1612'. In some aspects, the network entity 1660 may further include additional memory modules 1614. The network entity 1660 communicates via the network interface 1680 directly (e.g., backhaul link) or indirectly (e.g., through a RIC) with the CU 1602. The on-chip memory 1612' and the additional memory modules 1614 may each be considered a computer-readable medium/memory. Each computer-readable medium/memory may be non-transitory. The network processor(s) 1612 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 197 may be configured to transmit a first configuration message including a first configuration to measure a first set of positioning signals associated with a first antenna and to measure a second set of positioning signals associated with a second antenna. The component 197 may be configured to transmit a second configuration message including a second configuration to transmit the first set of positioning signals associated with the first antenna and to transmit the second set of positioning signals associated with the second antenna. The component 197 may be configured to receive, based on the first configuration, a set of report messages including a first indicator of a first set of measurements of the first set of positioning signals associated with the first antenna and a second indicator of a second set of measurements of the second set of positioning signals associated with the second antenna. The component 197 may be within the network processor(s) 1612. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1660 may include a variety of components configured for various functions. In one configuration, the network entity 1660 may include means for transmitting a first configuration message including a first configuration to measure a first set of positioning signals associated with a first antenna and to measure a second set of positioning signals associated with a second antenna. The means may be the component 197 of the network entity 1660 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1. A method of wireless communication at a first wireless device, comprising receiving a configuration message comprising a configuration to measure a first set of positioning signals associated with a first antenna and to measure a second set of positioning signals associated with a second antenna. The method comprises receiving the first set of positioning signals associated with the first antenna and the second set of positioning signals associated with the second antenna. The method comprises measuring the first set of positioning signals associated with the first antenna and the second set of positioning signals associated with the second antenna. The method comprises transmitting a set of report messages comprising a first indicator of a first subset of the measured first set of positioning signals associated with the first antenna and a second indicator of a second subset of the measured second set of positioning signals associated with the second antenna.

Aspect 2. The method of aspect 1, wherein receiving the first set of positioning signals associated with the first antenna and the second set of positioning signals associated with the second antenna may comprise receiving the first set of positioning signals via the first antenna and the second set of positioning signals via the second antenna, wherein the first wireless device comprises the first antenna and the second antenna. In some aspects, receiving the first set of positioning signals associated with the first antenna and the second set of positioning signals associated with the second antenna may comprise receiving the first set of positioning signals from the first antenna and the second set of positioning signals from the second antenna, wherein a second wireless device comprises the first antenna and the second antenna.

Aspect 3. The method of aspect 2, wherein the second wireless device comprises a third antenna, wherein receiving the first set of positioning signals via the first antenna and the second set of positioning signals via the second antenna comprises (a) receiving, via the first antenna, the first set of positioning signals from the third antenna, and (b) receiving, via the second antenna, the second set of positioning signals from the third antenna.

Aspect 4. The method of aspect 2, wherein the first wireless device comprises a third antenna, wherein receiving the first set of positioning signals from the first antenna and the second set of positioning signals from the second antenna comprises (a) receiving, via the third antenna, the first set of positioning signals from the first antenna and (b) receiving, via the third antenna, the second set of positioning signals from the second antenna.

Aspect 5. The method of any of aspects 1 to 4, wherein transmitting the set of report messages comprising the first indicator of the first subset of the measured first set of positioning signals associated with the first antenna and the second indicator of the second subset of the measured second set of positioning signals associated with the second antenna comprises: (a) selecting, for the transmission, at least one of the first subset of the measured first set of positioning signals associated with the first antenna or the second subset of the measured second set of positioning signals associated with the second antenna based on at least one of (1) a signal-to-noise ratio (SNR) satisfying a first threshold range, (2) a reference signal received power (RSRP) satisfying a second threshold range, (3) a line-of-sight (LOS) probability satisfying a third threshold range, (4) a time of arrival (ToA) satisfying a fourth threshold range, (5) a reference signal time difference (RSTD) satisfying a fifth threshold range, (6) a delay spread satisfying a sixth threshold range, or (7) a Rician factor satisfying a seventh threshold range; and (b) transmitting the selected at least one of the first subset of the measured first set of positioning signals associated with the first antenna or the second subset of the measured second set of positioning signals associated with the second antenna.

Aspect 6. The method of aspect 5, further comprising receiving a second configuration comprising at least one of (a) a third indicator of the first threshold range, (b) a fourth indicator of the second threshold range, (c) a fifth indicator of the third threshold range, (d) a sixth indicator of the fourth threshold range, (e) a seventh indicator of the fifth threshold range, (f) an eighth indicator of the sixth threshold range, or (g) a ninth indicator of the seventh threshold range. Receiving the second configuration may comprise receiving a second configuration message comprising the second configuration, or receiving the configuration message of aspect 1 comprising the second configuration.

Aspect 7. The method of any of aspects 1 to 6, wherein receiving the first set of positioning signals associated with the first antenna and the second set of positioning signals associated with the second antenna comprises receiving a plurality of sets of positioning signals, wherein the plurality of sets of positioning signals comprises the first set of positioning signals and the second set of positioning signals, wherein the first antenna and the second antenna are included in a plurality of antennas, wherein each set of the plurality of sets of positioning signals is associated with an antenna of the plurality of antennas, wherein measuring the first set of positioning signals associated with the first antenna and the second set of positioning signals associated with the second antenna comprises measuring the plurality of sets of positioning signals, wherein transmitting the set of report messages comprising the first indicator of the first subset of the measured first set of positioning signals associated with the first antenna and the second indicator of the second subset of the measured second set of positioning signals associated with the second antenna comprises: (a) ranking the measured plurality of sets of positioning signals by each associated antenna of the plurality of antennas based on at least one of (1) a signal-to-noise ratio (SNR), (2) a reference signal received power (RSRP), (3) a line-of-sight (LOS) probability, (4) a time of arrival (ToA), (5) a reference signal time difference (RSTD), (6) a delay spread, or (7) a Rician factor; (b) selecting, for the transmission, a third subset of the measured plurality of sets of positioning signals associated with a number of the plurality of antennas based on the ranking; and (c) transmitting a third indicator of the selected third subset of the measured plurality of sets of positioning signals, wherein the selected third subset of the measured plurality of sets of positioning signals comprises the first subset of the measured first set of positioning signals and the second subset of the measured second set of positioning signals.

Aspect 8. The method of aspect 7, further comprising receiving a second configuration message comprising at least one of the plurality of antennas.

Aspect 9. The method of any of aspects 1 to 8, further comprising transmitting a capability message comprising a capability to transmit the set of report messages comprising the measured first set of positioning signals associated with the first antenna and the measured second set of positioning signals associated with the second antenna, wherein the configuration is based on the capability.

Aspect 10. The method of aspect 9, further comprising receiving a request message comprising a request for the capability, wherein the transmission of the capability message is in response to the reception of the request message.

Aspect 11. The method of aspect either of aspects 9 or 10, wherein the capability comprises at least one of: (a) a third indicator of a maximum number of antennas to include in a report message of the set of report messages; (b) a fourth indicator of a set of ranking metrics to associate with the report message of the set of report messages; or (c) a fifth indicator of a set of measurement types to associate with the report message of the set of report messages.

Aspect 12. The method of aspect 11, wherein the set of measurement types comprises at least one of: (a) a reference signal time difference (RSTD) measurement; (b) a line-of-sight (LOS) measurement; (c) a reference signal received power (RSRP) measurement; (d) a reference signal received power path (RSRPP) measurement; (e) an angle of departure (AoD) measurement; (f) a channel impulse response (CIR) measurement; (g) a channel frequency response (CFR) measurement; (h) a power delay profile (PDP) measurement; or (i) a delay profile (DP) measurement.

Aspect 13. The method of any of aspects 9 to 12, wherein the capability message comprises a long-term evolution (LTE) positioning protocol (LPP) message.

Aspect 14. The method of any of aspects 1 to 13, further comprising receiving assistance data (AD) associated with the first set of positioning signals and the second set of positioning signals, wherein at least one of the measurement of the first set of positioning signals and the second set of positioning signals or the transmission of the set of report messages is based on the AD.

Aspect 15. The method of aspect 14, wherein the AD comprises at least one of: (a) a third indicator of a set of transmission antennas and a set of reception antennas associated with the first set of positioning signals and the second set of positioning signals; (b) a fourth indicator of a set of ranking metrics to associate with the set of report messages; (c) a fifth indicator of a measurement gap associated with at least one of the first set of positioning signals and the second set of positioning signals; (d) a sixth indicator of a periodicity associated with the set of report messages; (e) a seventh indicator of a quantity associated with the set of report messages; (f) an eighth indicator of an occasion associated with the set of report messages; or (g) a ninth indicator of a measurement type associated with the set of report messages.

Aspect 16. The method of either of aspects 14 or 15, further comprising transmitting a request message comprising a request for the AD before the reception of the AD.

Aspect 17. The method of any of aspects 14 to 16, wherein receiving the AD comprises receiving a long-term evolution (LTE) positioning protocol (LPP) message comprising the AD.

Aspect 18. The method of any of aspects 1 to 17, wherein the first set of positioning signals and the second set of positioning signals comprise at least one of a positioning reference signal (PRS), a sounding reference signal (SRS), a channel state information (CSI) reference signal (CSI-RS), a tracking reference signal (TRS), or a synchronization signal block (SSB).

Aspect 19. A method of wireless communication at a network entity, comprising transmitting a first configuration message comprising a first configuration to measure a first set of positioning signals associated with a first antenna and to measure a second set of positioning signals associated with a second antenna. The method comprises transmitting a second configuration message comprising a second configuration to transmit the first set of positioning signals associated with the first antenna and to transmit the second set of positioning signals associated with the second antenna. The method comprises receiving, based on the first configuration, a set of report messages comprising a first indicator of a first set of measurements of the first set of positioning signals associated with the first antenna and a second indicator of a second set of measurements of the second set of positioning signals associated with the second antenna.

Aspect 20. The method of aspect 19, wherein the first antenna comprises a first transmission antenna for a transmission of the first set of positioning signals and the second antenna comprises a second transmission antenna for a transmission of the second set of positioning signals.

Aspect 21. The method of aspect 19, wherein the first antenna comprises a first reception antenna for a reception of the first set of positioning signals and the second antenna comprises a second reception antenna for a reception of the second set of positioning signals.

Aspect 22. The method of any of aspects 19 to 21, wherein the first set of measurements and the second set of measurements comprise at least one of: (a) a signal-to-noise ratio (SNR) satisfying a first threshold range; (b) a reference signal received power (RSRP) satisfying a second threshold range; (c) a line-of-sight (LOS) probability satisfying a third threshold range; (d) a time of arrival (ToA) satisfying a fourth threshold range; (e) a reference signal time difference (RSTD) satisfying a fifth threshold range; (f) a delay spread satisfying a sixth threshold range; or (g) a Rician factor satisfying a seventh threshold range.

Aspect 23. The method of aspect 22, further comprising transmitting a third configuration comprising at least one of: (a) a third indicator of the first threshold range; (b) a fourth indicator of the second threshold range; (c) a fifth indicator of the third threshold range; a sixth indicator of the fourth threshold range; (d) a seventh indicator of the fifth threshold range; (e) an eighth indicator of the sixth threshold range; or (f) a ninth indicator of the seventh threshold range. Transmitting the third configuration may include transmitting a third configuration message comprising the third configuration or transmitting the first configuration message of aspect 19, wherein the first configuration message comprises the third configuration.

Aspect 24. The method of any of aspects 19 to 23, wherein the first configuration message comprises a third configuration to measure a plurality of sets of positioning signals, wherein the plurality of sets of positioning signals comprises the first set of positioning signals and the second set of positioning signals, wherein the first antenna and the second antenna are included in a plurality of antennas, wherein each set of the plurality of sets of positioning signals is associated with an antenna of the plurality of antennas, wherein the second configuration message comprises a fourth configuration to transmit the plurality of sets of positioning signals. The method further comprises transmitting a fifth configuration comprising a number of a plurality of antennas associated with the set of report messages, wherein the set of report messages comprises a third subset of the measured plurality of sets of positioning signals associated with the number of the plurality of antennas.

Aspect 25. The method of any of aspects 19 to 24, further comprising: (a) receiving a capability message comprising a capability to transmit the set of report messages; and (b) configuring the first configuration based on the capability.

Aspect 26. The method of aspect 25, further comprising transmitting a request message comprising a request for the capability before the reception of the capability message.

Aspect 27. The method of either of aspects 25 or 26, wherein the capability comprises at least one of: (a) a third indicator of a maximum number of antennas to include in a report message of the set of report messages; (b) a fourth indicator of a set of ranking metrics to associate with the report message of the set of report messages; or (c) a fifth indicator of a set of measurement types to associate with the report message of the set of report messages.

Aspect 28. The method of aspect 27, wherein the set of measurement types comprise at least one of: (a) a reference signal time difference (RSTD) measurement; (b) a line-of-sight (LOS) measurement; (c) a reference signal received power (RSRP) measurement; (d) a reference signal received power path (RSRPP) measurement; (e) an angle of departure (AoD) measurement; (f) a channel impulse response (CIR) measurement; (g) a channel frequency response (CFR) measurement; (h) a power delay profile (PDP) measurement; or (i) a delay profile (DP) measurement.

Aspect 29. The method of any of aspects 25 to 28, wherein the capability message comprises a long-term evolution (LTE) positioning protocol (LPP) message.

Aspect 30. The method of any of aspects 19 to 29, further comprising transmitting assistance data (AD) associated with at least one of the measurement or the transmission of the first set of positioning signals and the second set of positioning signals.

Aspect 31. The method of aspect 30, wherein the AD comprises at least one of: (a) a third indicator of a set of transmission antennas and a set of reception antennas associated with the first set of positioning signals and the second set of positioning signals; (b) a fourth indicator of a set of ranking metrics to associate with the set of report messages; (c) a fifth indicator of a measurement gap associated with at least one of the first set of positioning signals and the second set of positioning signals; (d) a sixth indicator of a periodicity associated with the set of report messages; (e) a seventh indicator of a quantity associated with the set of report messages; (f) an eighth indicator of an occasion associated with the set of report messages; or (g) a ninth indicator of a measurement type associated with the set of report messages.

Aspect 32. The method of any of aspects 19 to 31, wherein the first set of positioning signals and the second set of positioning signals comprise at least one of: (a) a positioning reference signal (PRS); (b) a channel state information (CSI) reference signal (CSI-RS); (c) a synchronization signal block (SSB); (d) a sounding reference signal (SRS), or (e) a tracking reference signal (TRS).

Aspect 33. The method of any of aspects 19 to 32, wherein the network entity comprises a location management function (LMF).

Aspect 34. A method of wireless communication at a second wireless device, comprising receiving a configuration message comprising a configuration to transmit a first set of positioning signals associated with a first antenna and to transmit a second set of positioning signals associated with a second antenna. The method comprises transmitting the first set of positioning signals associated with the first antenna and the second set of positioning signals associated with the second antenna. Transmitting the first set of positioning signals and the second set of positioning signals may include transmitting the first and second sets of positioning signals to a first wireless device.

Aspect 35. The method of aspect 34, wherein transmitting the first set of positioning signals associated with the first antenna and the second set of positioning signals associated with the second antenna comprises transmitting the first set of positioning signals via the first antenna and the second set of positioning signals via the second antenna, wherein the second wireless device comprises the first antenna and the second antenna; or transmitting the first set of positioning signals to the first antenna and the second set of positioning signals to the second antenna, wherein a second wireless device comprises the first antenna and the second antenna.

Aspect 36. The method of aspect 35, wherein the second wireless device comprises a third antenna, wherein transmitting the first set of positioning signals to the first antenna and the second set of positioning signals to the second antenna comprises: (a) transmitting, via the third antenna, the first set of positioning signals to the first antenna; and (b) transmitting, via the third antenna, the second set of positioning signals to the second antenna.

Aspect 37. The method of aspect 35, wherein the second wireless device comprises a third antenna, wherein transmitting the first set of positioning signals via the first antenna and the second set of positioning signals via the second antenna comprises: (a) transmitting, via the first antenna, the first set of positioning signals to the third antenna; and (b) transmitting, via the second antenna, the second set of positioning signals to the third antenna.

Aspect 38. The method of any of aspects 34 to 37, further comprising receiving assistance data (AD) associated with the first set of positioning signals and the second set of positioning signals, wherein transmitting the first set of positioning signals and the second set of positioning signals is based on the AD.

Aspect 39. The method of any of aspects 34 to 38, wherein the first set of positioning signals and the second set of positioning signals comprise at least one of: (a) a positioning reference signal (PRS); (b) a channel state information (CSI) reference signal (CSI-RS); (c) a synchronization signal block (SSB); (d) a sounding reference signal (SRS); or (e) a tracking reference signal (TRS).

Aspect 40. The method of any of aspects 34 to 39, wherein the second wireless device comprises a transmission reception point (TRP).

Aspect 41, The method of any of aspects 1 to 18, wherein the first wireless device comprises at least one of a user equipment (UE), a base station, or a transmission reception point (TRP).

Aspect 42 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 41.

Aspect 43 is an apparatus for wireless communication, comprising means for performing each step in the method of any of aspects 1 to 41.

Aspect 44 is the apparatus of any of aspects 1 to 41, further comprising a transceiver configured to receive or to transmit in association with the method of any of aspects 1 to 41.

Aspect 45 is a computer-readable medium (e.g., a non-transitory computer-readable medium) storing computer executable code, the code when executed by at least one processor causes the at least one processor to perform the method of any of aspects 1 to 41.

What is claimed is:

1. An apparatus for wireless communication at a first wireless device, comprising:

at least one memory; and at least one processor coupled to the at least one memory and, based at least in part on information stored in the at least one memory, the at least one processor is configured to:

receive a configuration message comprising a configuration to measure a first set of positioning signals associated with a first antenna and to measure a second set of positioning signals associated with a second antenna;

receive the first set of positioning signals associated with the first antenna and the second set of positioning signals associated with the second antenna;

measure the first set of positioning signals associated with the first antenna and the second set of positioning signals associated with the second antenna; and transmit a set of report messages comprising a first indicator of a first subset of the measured first set of positioning signals associated with the first antenna and a second indicator of a second subset of the measured second set of positioning signals associated with the second antenna.

2. The apparatus of claim 1, wherein, to receive the first set of positioning signals associated with the first antenna and the second set of positioning signals associated with the second antenna, the at least one processor is configured to:

receive the first set of positioning signals received via the first antenna and the second set of positioning signals received via the second antenna, wherein the first wireless device comprises the first antenna and the second antenna; or receive the first set of positioning signals transmitted from the first antenna and the second set of positioning signals transmitted from the second antenna, wherein a second wireless device comprises the first antenna and the second antenna.

3. The apparatus of claim 2, wherein the second wireless device comprises a third antenna, wherein, to receive the first set of positioning signals received via the first antenna and the second set of positioning signals received via the second antenna, the at least one processor is configured to:

receive, via the first antenna, the first set of positioning signals transmitted from the third antenna; and receive, via the second antenna, the second set of positioning signals transmitted from the third antenna.

4. The apparatus of claim 2, further comprising a transceiver coupled to the at least one processor, wherein the first wireless device comprises a third antenna, wherein, to receive the first set of positioning signals transmitted from the first antenna and the second set of positioning signals transmitted from the second antenna, the at least one processor is configured to:

receive, via the third antenna and the transceiver, the first set of positioning signals transmitted from the first antenna; and receive, via the third antenna and the transceiver, the second set of positioning signals transmitted from the second antenna.

5. The apparatus of claim 1, wherein, to transmit the set of report messages comprising the first indicator of the first subset of the measured first set of positioning signals associated with the first antenna and the second indicator of the second subset of the measured second set of positioning signals associated with the second antenna, the at least one processor is configured to:

select, for the transmission of the set of report messages, at least one of the first subset of the measured first set of positioning signals associated with the first antenna or the second subset of the measured second set of positioning signals associated with the second antenna based on at least one of:

a signal-to-noise ratio (SNR) satisfying a first threshold range;

a reference signal received power (RSRP) satisfying a second threshold range;

a line-of-sight (LOS) probability satisfying a third threshold range;

a time of arrival (ToA) satisfying a fourth threshold range;

a reference signal time difference (RSTD) satisfying a fifth threshold range;

a delay spread satisfying a sixth threshold range; or a Rician factor satisfying a seventh threshold range; and transmit the selected at least one of the first subset of the measured first set of positioning signals associated with the first antenna or the second subset of the measured second set of positioning signals associated with the second antenna.

6. The apparatus of claim 5, wherein the at least one processor is further configured to:

receive a second configuration comprising at least one of:

a third indicator of the first threshold range;

a fourth indicator of the second threshold range;

a fifth indicator of the third threshold range;

a sixth indicator of the fourth threshold range;

a seventh indicator of the fifth threshold range;

an eighth indicator of the sixth threshold range; or a ninth indicator of the seventh threshold range.

7. The apparatus of claim 1, wherein, to receive the first set of positioning signals associated with the first antenna and the second set of positioning signals associated with the second antenna, the at least one processor is configured to:

receive a plurality of sets of positioning signals, wherein the plurality of sets of positioning signals comprises the first set of positioning signals and the second set of positioning signals, wherein the first antenna and the second antenna are included in a plurality of antennas, wherein each set of the plurality of sets of positioning signals is associated with an antenna of the plurality of antennas, wherein, to measure the first set of positioning signals associated with the first antenna and the second set of positioning signals associated with the second antenna, the at least one processor is configured to:

measure the plurality of sets of positioning signals, wherein, to transmit the set of report messages comprising the first indicator of the first subset of the measured first set of positioning signals associated with the first antenna and the second indicator of the second subset of the measured second set of positioning signals associated with the second antenna, the at least one processor is configured to:

rank the measured plurality of sets of positioning signals by each associated antenna of the plurality of antennas based on at least one of:

a signal-to-noise ratio (SNR);

a reference signal received power (RSRP);

a line-of-sight (LOS) probability;

a time of arrival (ToA);

a reference signal time difference (RSTD);

a delay spread; or a Rician factor;

select, for the transmission of the set of report messages, a third subset of the measured plurality of sets of positioning signals associated with a number of the plurality of antennas based on the ranking; and transmit a third indicator of the selected third subset of the measured plurality of sets of positioning signals, wherein the selected third subset of the measured plurality of sets of positioning signals comprises the first subset of the measured first set of positioning signals and the second subset of the measured second set of positioning signals.

8. The apparatus of claim 7, wherein the at least one processor is further configured to:

receive a second configuration message comprising at least one of the plurality of antennas.

9. The apparatus of claim 1, wherein the at least one processor is further configured to:

transmit a capability message comprising a capability to transmit the set of report messages comprising the measured first set of positioning signals associated with the first antenna and the measured first set of positioning signals associated with the second antenna, wherein the configuration is based on the capability.

10. The apparatus of claim 9, wherein the at least one processor is further configured to:

receive a request message comprising a request for the capability, wherein the transmission of the capability message is in response to the reception of the request message, wherein the capability message comprises a long-term evolution (LTE) positioning protocol (LPP) message.

11. The apparatus of claim 9, wherein the capability comprises at least one of:

a third indicator of a maximum number of antennas to include in a report message of the set of report messages;

a fourth indicator of a set of ranking metrics to associate with the report message of the set of report messages; or a fifth indicator of a set of measurement types to associate with the report message of the set of report messages.

12. The apparatus of claim 11, wherein the set of measurement types comprises at least one of:

a reference signal time difference (RSTD) measurement;

a line-of-sight (LOS) measurement;

a reference signal received power (RSRP) measurement;

a reference signal received power path (RSRPP) measurement;

an angle of departure (AoD) measurement;

a channel impulse response (CIR) measurement;

a channel frequency response (CFR) measurement;

a power delay profile (PDP) measurement; or a delay profile measurement.

13. The apparatus of claim 9, wherein the configuration message comprises a third indicator of the first set of positioning signals and the first antenna and a fourth indicator of the second set of positioning signals and the second antenna.

14. The apparatus of claim 1, wherein the at least one processor is further configured to:

receive assistance data (AD) associated with the first set of positioning signals and the second set of positioning signals, wherein at least one of the measurement of the first set of positioning signals and the second set of positioning signals or the transmission of the set of report messages is based on the AD.

15. The apparatus of claim 14, wherein the AD comprises at least one of:

a third indicator of a set of transmission antennas and a set of reception antennas associated with the first set of positioning signals and the second set of positioning signals;

a fourth indicator of a set of ranking metrics to associate with the set of report messages;

a fifth indicator of a measurement gap associated with at least one of the first set of positioning signals and the second set of positioning signals;

a sixth indicator of a periodicity associated with the set of report messages;

a seventh indicator of a quantity associated with the set of report messages;

an eighth indicator of an occasion associated with the set of report messages; or a ninth indicator of a measurement type associated with the set of report messages.

16. The apparatus of claim 14, wherein the at least one processor is further configured to:

transmit a request message comprising a request for the AD before the reception of the AD, wherein, to receive the AD, the at least one processor is configured to:

receive a long-term evolution (LTE) positioning protocol (LPP) message comprising the AD.

17. The apparatus of claim 1, wherein the set of report messages further comprises a third indicator of the first antenna associated with the first subset of the measured first set of positioning signals and a fourth indicator of the second antenna associated with the second subset of the measured second set of positioning signals.

18. The apparatus of claim 1, wherein the first set of positioning signals and the second set of positioning signals comprise at least one of:

a positioning reference signal (PRS);

a channel state information (CSI) reference signal (CSI-RS);

a tracking reference signal (TRS);

a synchronization signal block (SSB); or a sounding reference signal (SRS).

19. An apparatus for wireless communication at a network entity, comprising:

at least one memory; and at least one processor coupled to the at least one memory and, based at least in part on information stored in the at least one memory, the at least one processor is configured to:

transmit a first configuration message comprising a first configuration to measure a first set of positioning signals associated with a first antenna and to measure a second set of positioning signals associated with a second antenna;

transmit a second configuration message comprising a second configuration to transmit the first set of positioning signals associated with the first antenna and to transmit the second set of positioning signals associated with the second antenna; and receive, based on the first configuration, a set of report messages comprising a first indicator of a first set of measurements of the first set of positioning signals associated with the first antenna and a second indicator of a second set of measurements of the second set of positioning signals associated with the second antenna.

20. The apparatus of claim 19, wherein the first antenna comprises a first transmission antenna for a first transmission of the first set of positioning signals and the second antenna comprises a second transmission antenna for a second transmission of the second set of positioning signals.

21. The apparatus of claim 19, wherein the first antenna comprises a first reception antenna for a first reception of the first set of positioning signals and the second antenna comprises a second reception antenna for a second reception of the second set of positioning signals.

22. The apparatus of claim 19, wherein the first set of measurements and the second set of measurements comprise at least one of:

a signal-to-noise ratio (SNR) satisfying a first threshold range;

a reference signal received power (RSRP) satisfying a second threshold range;

a line-of-sight (LOS) probability satisfying a third threshold range;

a time of arrival (ToA) satisfying a fourth threshold range;

a reference signal time difference (RSTD) satisfying a fifth threshold range;

a delay spread satisfying a sixth threshold range; or a Rician factor satisfying a seventh threshold range.

23. The apparatus of claim 22, further comprising a transceiver coupled to the at least one processor, wherein the at least one processor is further configured to:

transmit, via the transceiver, a third configuration comprising at least one of:

a third indicator of the first threshold range;

a fourth indicator of the second threshold range;

a fifth indicator of the third threshold range;

a sixth indicator of the fourth threshold range;

a seventh indicator of the fifth threshold range;

an eighth indicator of the sixth threshold range; or a ninth indicator of the seventh threshold range.

24. The apparatus of claim 19, wherein the first configuration message comprises a third configuration to measure a plurality of sets of positioning signals, wherein the plurality of sets of positioning signals comprises the first set of positioning signals and the second set of positioning signals, wherein the first antenna and the second antenna are included in a plurality of antennas, wherein each set of the plurality of sets of positioning signals is associated with an antenna of the plurality of antennas, wherein the second configuration message comprises a fourth configuration to transmit the plurality of sets of positioning signals, wherein the at least one processor is further configured to:

transmit a fifth configuration comprising a number of a plurality of antennas associated with the set of report messages, wherein the set of report messages comprises a third subset of the measured plurality of sets of positioning signals associated with the number of the plurality of antennas.

25. The apparatus of claim 19, wherein the at least one processor is further configured to:

receive a capability message comprising a capability to transmit the set of report messages comprising the first indicator of the first set of measurements of the first set of positioning signals associated with the first antenna and the second indicator of the second set of measurements of the second set of positioning signals associated with the second antenna; and configure the first configuration based on the capability.

26. The apparatus of claim 19, wherein the configuration message comprises a third indicator the first set of positioning signals and the first antenna and a fourth indicator of the second set of positioning signals and the second antenna.

27. The apparatus of claim 19, wherein the at least one processor is further configured to:

transmit assistance data (AD) associated with at least one of the measurement or the transmission of the first set of positioning signals and the second set of positioning signals.

28. The apparatus of claim 27, wherein the AD comprises at least one of:

a third indicator of a set of transmission antennas and a set of reception antennas associated with the first set of positioning signals and the second set of positioning signals;

a fourth indicator of a set of ranking metrics to associate with the set of report messages;

a fifth indicator of a measurement gap associated with the set of report messages;

a sixth indicator of a periodicity associated with the set of report messages;

a seventh indicator of a quantity associated with the set of report messages;

an eighth indicator of an occasion associated with the set of report messages; or a ninth indicator of a measurement type associated with the set of report messages.

29. A method of wireless communication at a first wireless device, comprising:

receiving a configuration message comprising a configuration to measure a first set of positioning signals associated with a first antenna and to measure a second set of positioning signals associated with a second antenna;

receiving the first set of positioning signals associated with the first antenna and the second set of positioning signals associated with the second antenna;

measuring the first set of positioning signals associated with the first antenna and the second set of positioning signals associated with the second antenna; and transmitting a set of report messages comprising a first indicator of a first subset of the measured first set of positioning signals associated with the first antenna and a second indicator of a second subset of the measured second set of positioning signals associated with the second antenna.

30. A method of wireless communication at a network entity, comprising:

transmitting a first configuration message comprising a first configuration to measure a first set of positioning signals associated with a first antenna and to measure a second set of positioning signals associated with a second antenna;

transmitting a second configuration message comprising a second configuration to transmit the first set of positioning signals associated with the first antenna and to transmit the second set of positioning signals associated with the second antenna; and receiving, based on the first configuration, a set of report messages comprising a first indicator of a first set of measurements of the first set of positioning signals associated with the first antenna and a second indicator of a second set of measurements of the second set of positioning signals associated with the second antenna.

* * * * *